US012133054B2

(12) United States Patent
Puria et al.

(10) Patent No.: US 12,133,054 B2
(45) Date of Patent: Oct. 29, 2024

(54) DEVICES AND METHODS FOR HEARING

(71) Applicant: Earlens Corporation, Menlo Park, CA (US)

(72) Inventors: Sunil Puria, Boston, MA (US); Micha Rosen, Tzur Hadassah (IL); Jonathan P. Fay, Dexter, MI (US); Paul Rucker, San Francisco, CA (US); James Stone, Saratoga, CA (US)

(73) Assignee: Earlens Corporation, Menlo Park, CA (US)

( * ) Notice: Subject to any disclaimer, the term of this patent is extended or adjusted under 35 U.S.C. 154(b) by 705 days.

(21) Appl. No.: 17/243,497

(22) Filed: Apr. 28, 2021

(65) Prior Publication Data

US 2021/0266686 A1 Aug. 26, 2021

Related U.S. Application Data

(63) Continuation of application No. 16/260,684, filed on Jan. 29, 2019, now Pat. No. 11,057,714, which is a continuation of application No. 15/706,236, filed on Sep. 15, 2017, now Pat. No. 10,237,663, which is a continuation of application No. 15/425,684, filed on Feb. 6, 2017, now Pat. No. 10,743,110, which is a continuation of application No. 14/491,572, filed on Sep. 19, 2014, now Pat. No. 9,749,758, which is a continuation of application No. 13/069,262, filed on Mar. 22, 2011, now Pat. No. 8,858,419, which is a (Continued)

(51) Int. Cl.

| | |
|---|---|
| ***H04R 25/00*** | (2006.01) |
| ***H04R 11/02*** | (2006.01) |
| ***H04R 17/00*** | (2006.01) |
| ***H04R 23/00*** | (2006.01) |
| ***H04R 25/02*** | (2006.01) |

(52) U.S. Cl.

CPC ........... *H04R 25/606* (2013.01); *H04R 11/02* (2013.01); *H04R 17/00* (2013.01); *H04R 23/008* (2013.01); *H04R 25/02* (2013.01); *H04R 25/554* (2013.01); *H04R 25/65* (2013.01); *H04R 25/652* (2013.01); *H04R 2225/025* (2013.01); *H04R 2460/09* (2013.01); *H04R 2460/13* (2013.01)

(58) Field of Classification Search

CPC ............ H04R 25/606; H04R 2225/025; H04R 25/65

See application file for complete search history.

(56) References Cited

U.S. PATENT DOCUMENTS

| | | | | |
|---|---|---|---|---|
| 5,259,032 A * | 11/1993 | Perkins ................ | H04R 25/554 381/328 | |
| 6,940,989 B1 * | 9/2005 | Shennib ............... | H04R 25/606 381/328 | |
| 2006/0058573 A1 * | 3/2006 | Neisz .................. | H04R 25/606 600/25 | |

* cited by examiner

*Primary Examiner* — Thaddeus B Cox
*Assistant Examiner* — Joshua Daryl D Lannu
(74) *Attorney, Agent, or Firm* — Polsinelli PC

(57) ABSTRACT

A device to transmit an audio signal to a user comprises a transducer and a support. The support is configured for placement on the eardrum to drive the eardrum. The transducer is coupled to the support at a first location to decrease occlusion and a second location to drive the eardrum. The transducer may comprise one or more of an electromagnetic balanced armature transducer, a piezoelectric transducer, a magnetostrictive transducer, a photostrictive transducer, or a coil and magnet. The device may find use with open canal hearing aids.

5 Claims, 32 Drawing Sheets

Related U.S. Application Data continuation of application No. PCT/US2009/057719, filed on Sep. 21, 2009.

(60) Provisional application No. 61/139,526, filed on Dec. 19, 2008, provisional application No. 61/099,087, filed on Sep. 22, 2008, provisional application No. 61/109,785, filed on Oct. 30, 2008, provisional application No. 61/217,801, filed on Jun. 3, 2009.

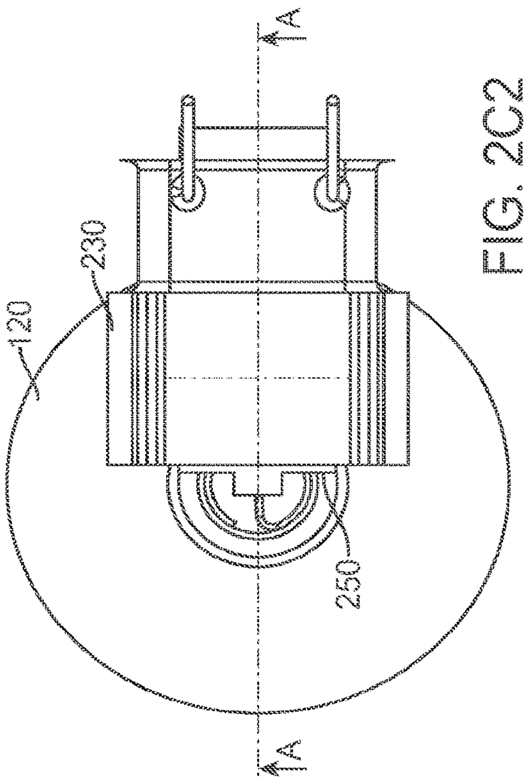
FIG. 2C2
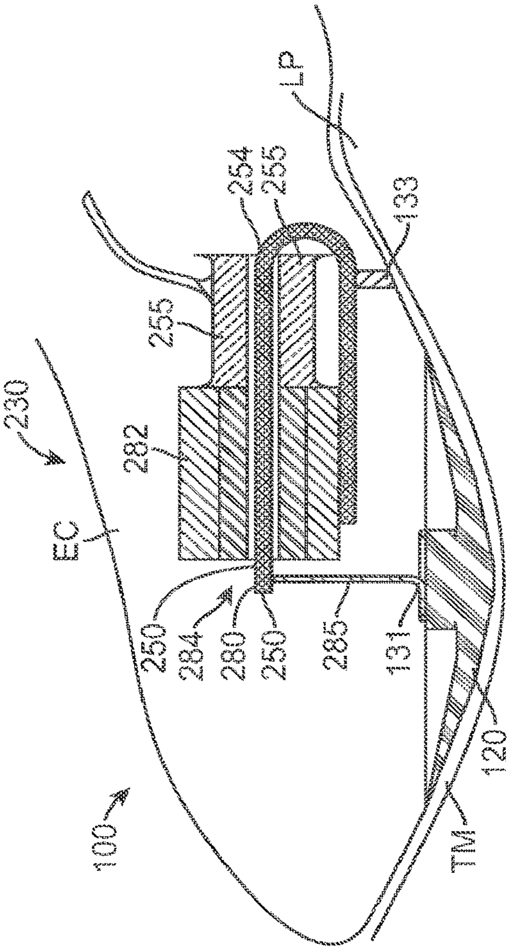
FIG. 2C3
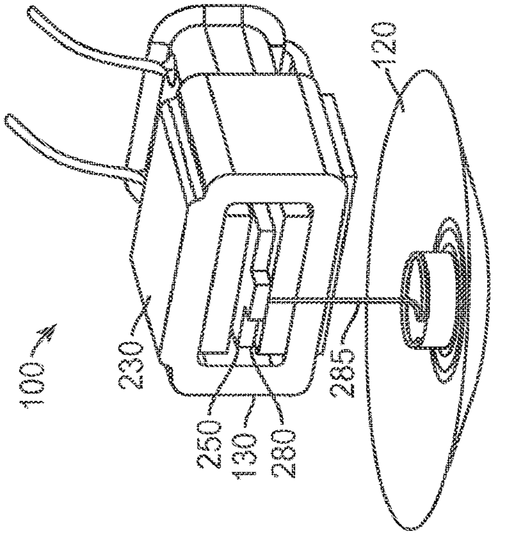
FIG. 2C1

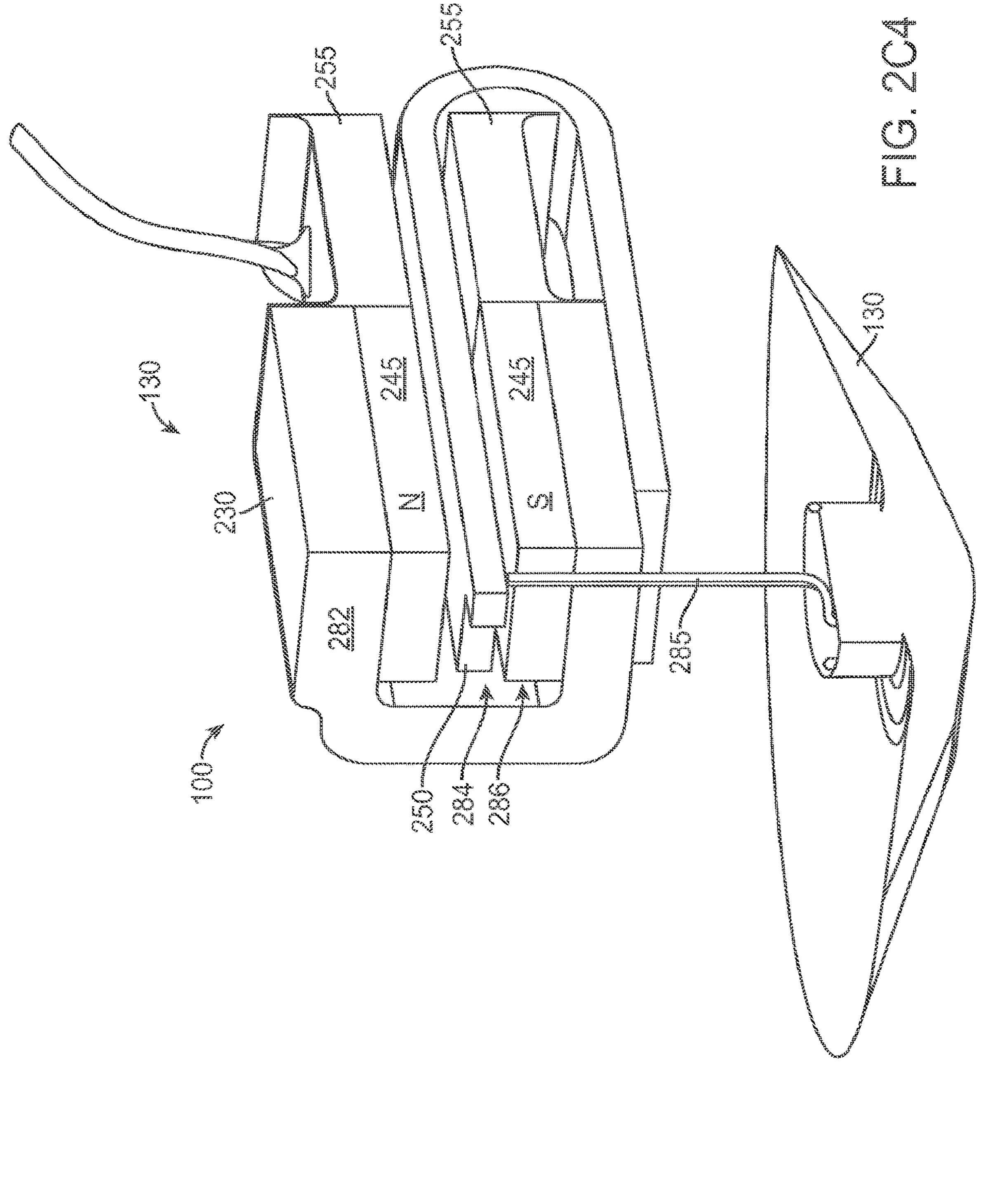
FIG. 2C4

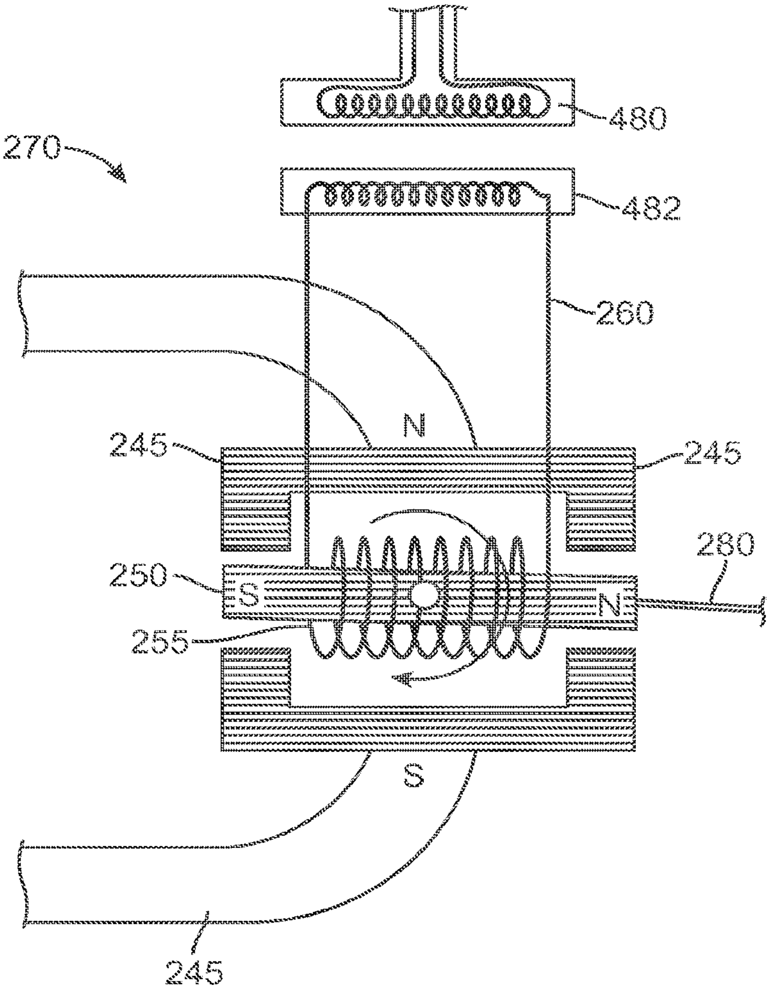
FIG. 4A
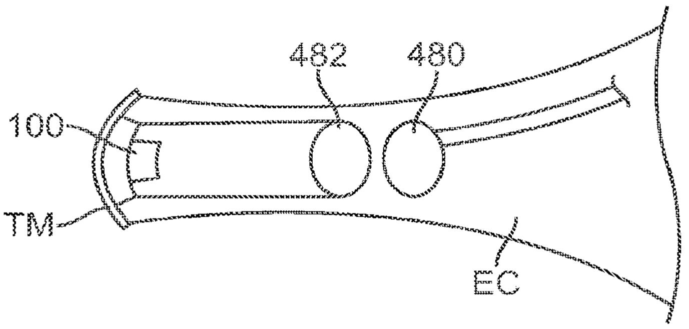
FIG. 4A1

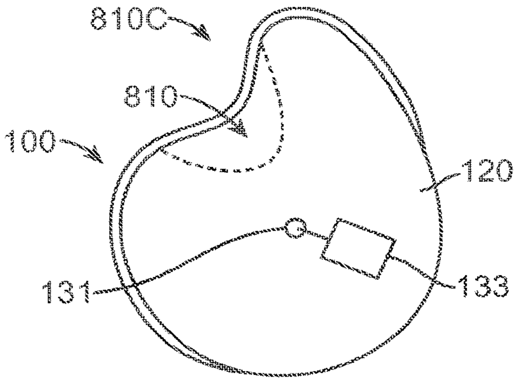
FIG. 8C
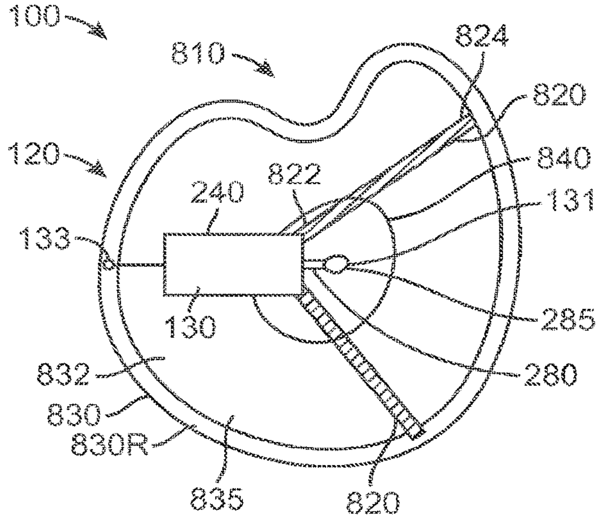
FIG. 8D
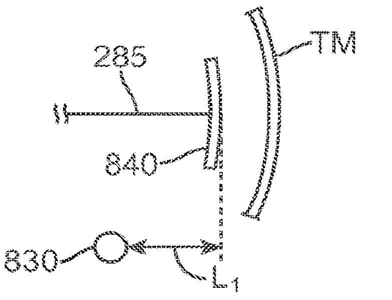
FIG. 8D1
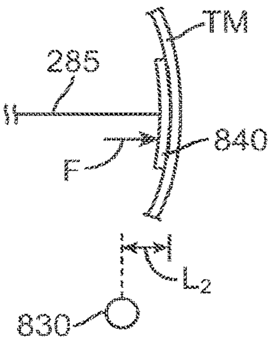
FIG. 8D2
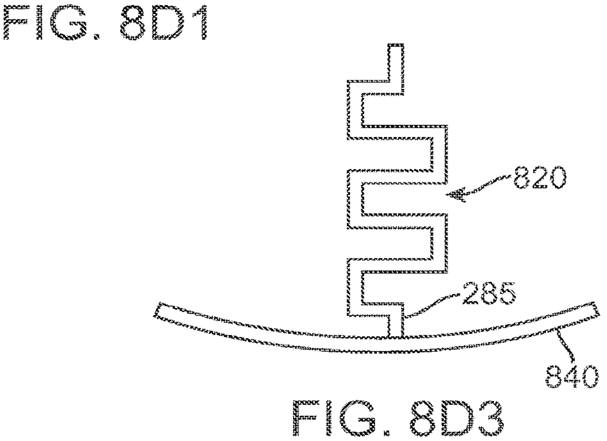
FIG. 8D3

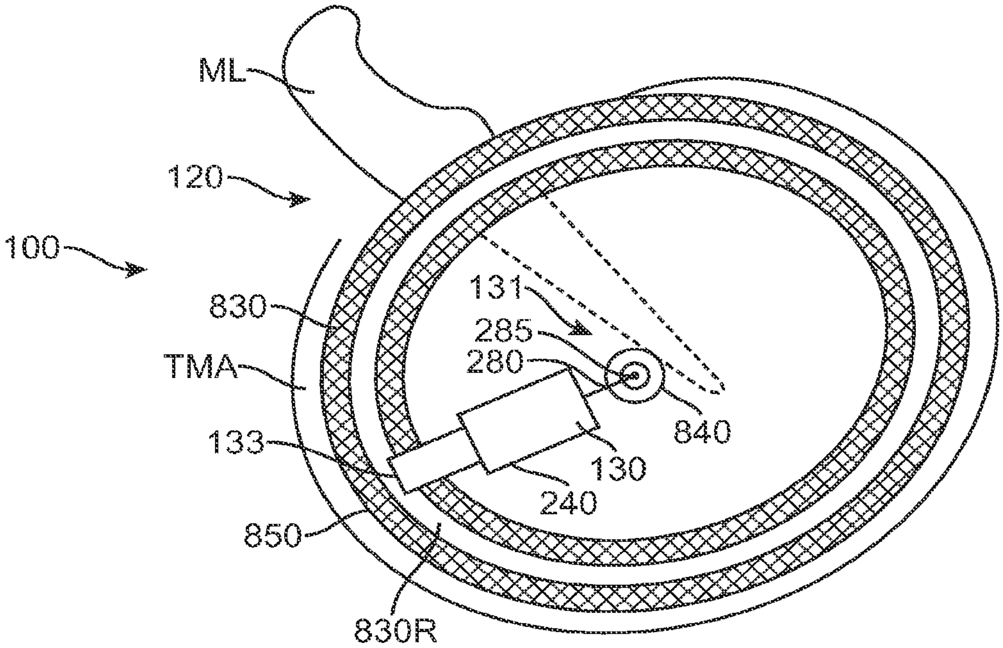
FIG. 8E1
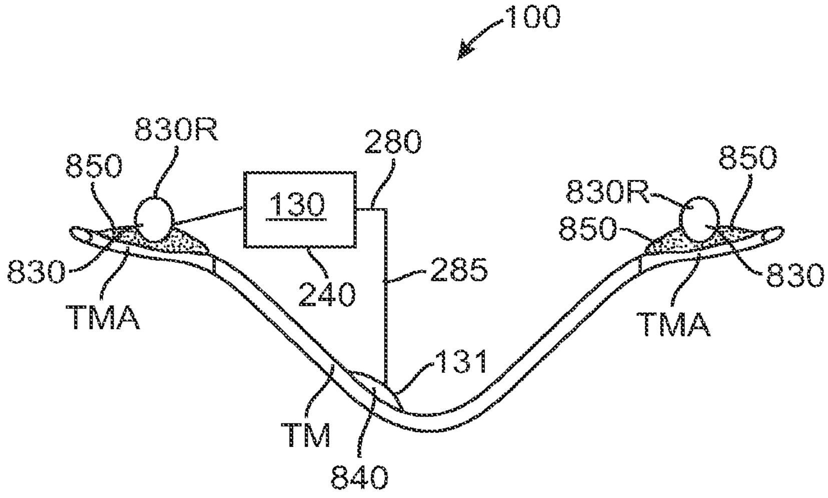
FIG. 8E2

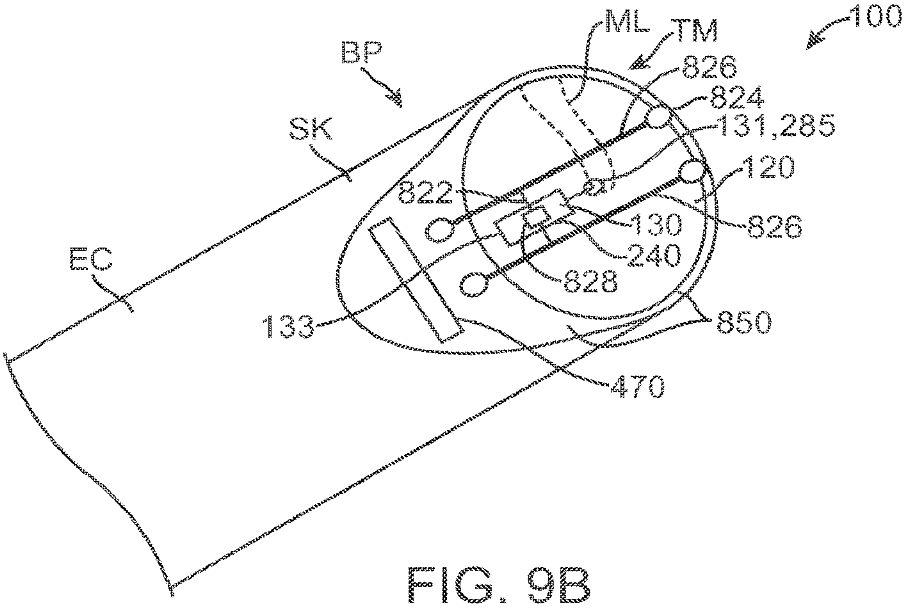
FIG. 9B
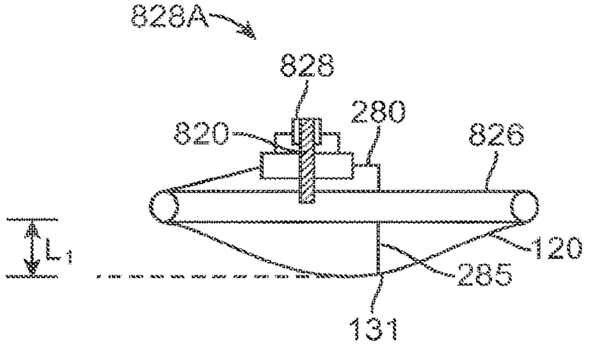
FIG. 9B1
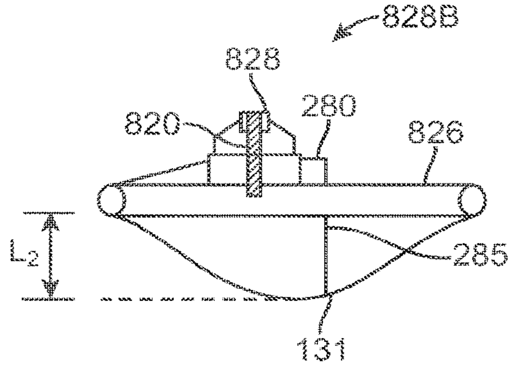
FIG. 9B2

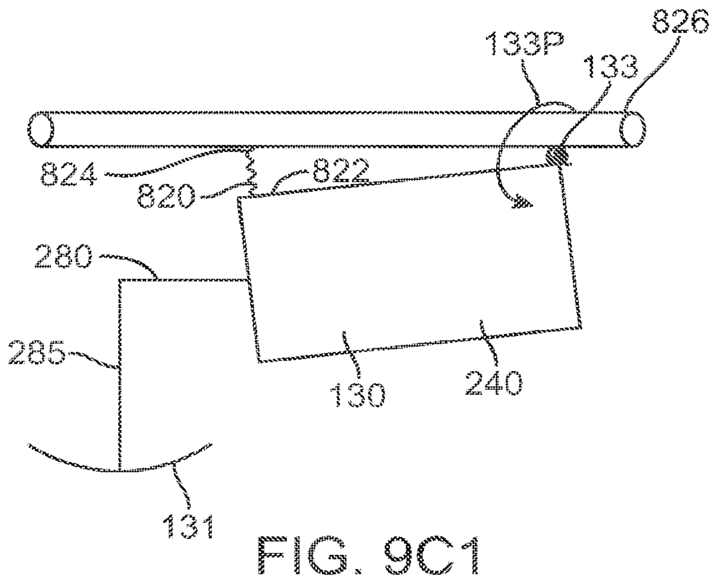
FIG. 9C1
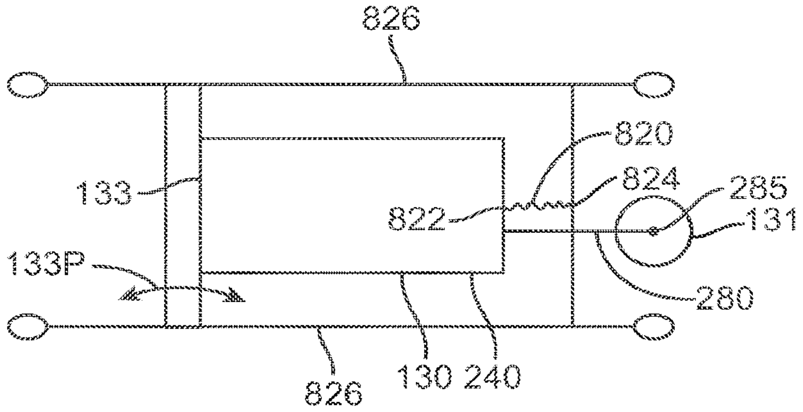
FIG. 9C2

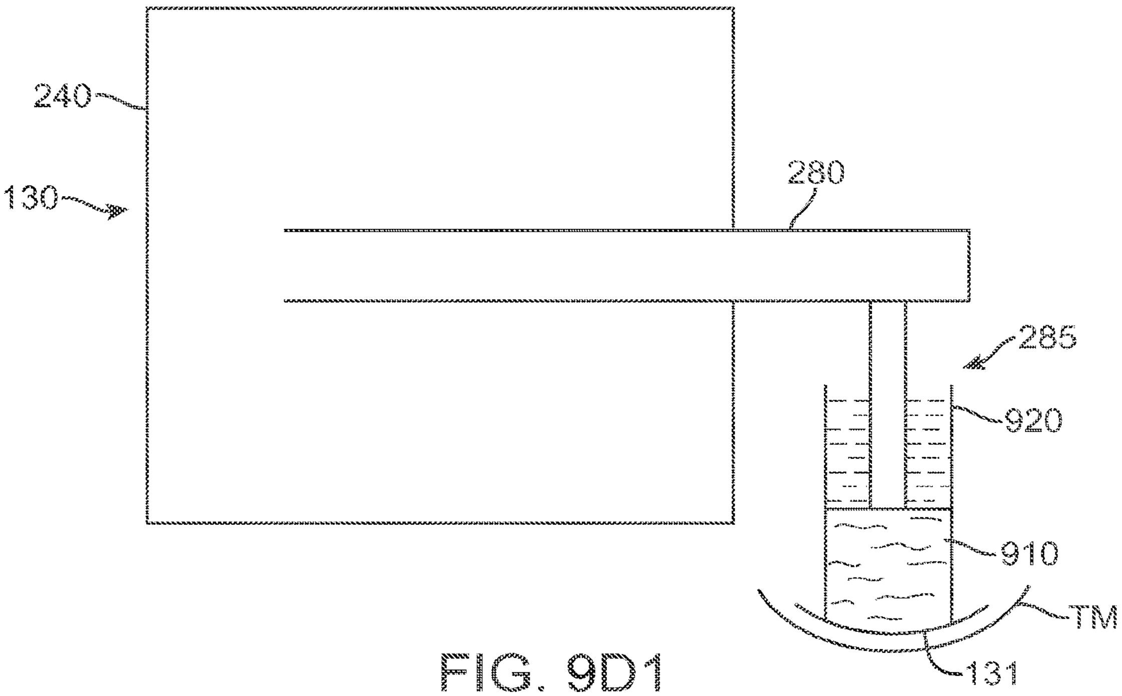
FIG. 9D1
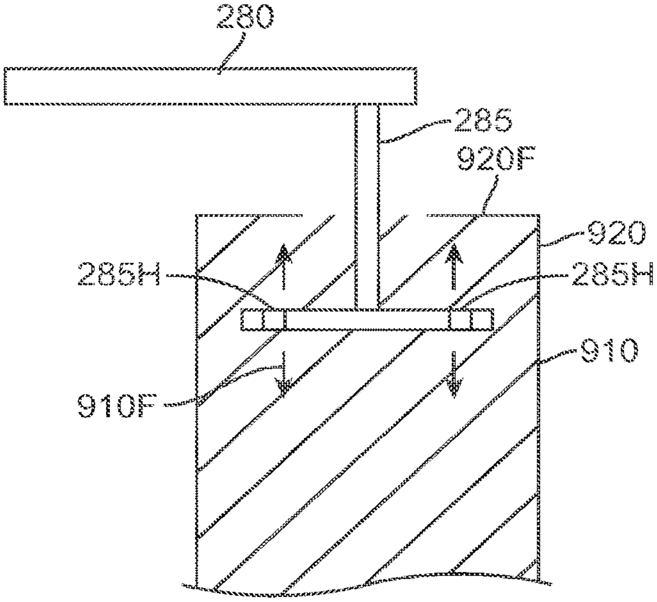
FIG. 9D2

DEVICES AND METHODS FOR HEARING

CROSS-REFERENCE

This application is a continuation of U.S. patent application Ser. No. 16/260,684, filed Jan. 29, 2019, now U.S. Pat. No. 11,057,714 which is a continuation of U.S. patent application Ser. No. 15/706,236, filed Sep. 15, 2017, now U.S. Pat. No. 10,237,663; which is a continuation of U.S. patent application Ser. No. 15/425,684, filed Feb. 6, 2017, now U.S. Pat. No. 10,743,110; which is a continuation of U.S. patent application Ser. No. 14/491,572, filed Sep. 19, 2014, now U.S. Pat. No. 9,749,758; which is a continuation of U.S. patent application Ser. No. 13/069,262, filed Mar. 22, 2011, now U.S. Pat. No. 8,858,419; which is a continuation of PCT Application No. PCT/US2009/057719, filed Sep. 21, 2009; which claims priority to U.S. Patent Application Nos.: 61/139,526 filed Dec. 19, 2008; 61/217,801 filed on Jun. 3, 2009; 61/099,087 filed Sep. 22, 2008; and 61/109,785 filed Oct. 30, 2008; the full disclosures of which are incorporated herein by reference.

STATEMENT AS TO RIGHTS TO INVENTIONS MADE UNDER FEDERALLY SPONSORED RESEARCH AND DEVELOPMENT

This invention was supported by grants from the National Institutes of Health (Grant No. R44DC008499-02A1). The Government may have certain rights in this invention.

BACKGROUND OF THE INVENTION

Field of the Invention

The present invention is related to hearing systems, devices and methods. Although specific reference is made to hearing aid systems, embodiments of the present invention can be used in many applications in which a signal is used to stimulate the ear.

People like to hear. Hearing allows people to listen to and understand others. Natural hearing can include spatial cues that allow a user to hear a speaker, even when background noise is present.

Hearing devices can be used with communication systems to help the hearing impaired. Hearing impaired subjects need hearing aids to verbally communicate with those around them. Open canal hearing aids have proven to be successful in the marketplace because of increased comfort and an improved cosmetic appearance. Another reason why open canal hearing aids can be popular is reduced occlusion of the ear canal. Occlusion can result in an unnatural, tunnel-like hearing effect which can be caused by hearing aids which at least partially occlude the ear canal. In at least some instances, occlusion can be noticed by the user when he or she speaks and the occlusion results in an unnatural sound during speech. However, a problem that may occur with open canal hearing aids is feedback. The feedback may result from placement of the microphone in too close proximity with the speaker or the amplified sound being too great. Thus, feedback can limit the degree of sound amplification that a hearing aid can provide. Although feedback can be decreased by placing the microphone outside the ear canal, this placement can result in the device providing an unnatural sound that is devoid of the spatial location information cues present with natural hearing.

In some instances, feedback may be decreased by using non-acoustic stimulation of the natural hearing transduction pathway, for example stimulating the tympanic membrane, bones of the ossicular chain and/or the cochlea. An output transducer may be placed on the eardrum, the ossicles in the middle ear, or the cochlea to stimulate the hearing pathway. Such an output transducer may be electro magnetically based. For example, the transducer may comprise a magnet and coil placed on the ossicles to stimulate the hearing pathway. Surgery is often needed to place a hearing device on the ossicles or cochlea, and such surgery can be somewhat invasive in at least some instances. At least some of the known methods of placing an electromagnetic transducer on the eardrum may result in occlusion in some instances.

One promising approach has been to place a transducer on the eardrum and drive the transducer. For example, a magnet can be placed on the eardrum and driven with a coil positioned away from the eardrum. The magnets can be electromagnetically driven with a coil to cause motion in the hearing transduction pathway thereby causing neural impulses leading to the sensation of hearing. A permanent magnet may be coupled to the ear drum through the use of a fluid and surface tension, for example as described in U.S. Pat. Nos. 5,259,032 and 6,084,975. Another approach can be to place a magnet and coil on the eardrum to vibrate the eardrum.

However, there is still room for improvement. The mass of a coil and magnet placed on the eardrum can result in occlusion in at least some instances. With a magnet positioned on the eardrum and coil positioned away from the magnet, the strength of the magnetic field generated to drive the magnet may decrease rapidly with the distance from the driver coil to the permanent magnet. Because of this rapid decrease in strength over distance, efficiency of the energy to drive the magnet may be less than ideal. Also, placement of the driver coil near the magnet may cause discomfort for the user in some instances. There can also be a need to align the driver coil with the permanent magnet that may, in some instances, cause the performance to be less than ideal.

For the above reasons, it would be desirable to provide hearing systems which at least decrease, or even avoid, at least some of the above mentioned limitations of the current hearing devices. For example, there is a need to provide a comfortable hearing device which provides hearing with natural qualities, for example with spatial information cues, and which allow the user to hear with less occlusion, distortion and feedback than current devices.

Description of the Background Art

Patents and publications that may be relevant to the present application include: U.S. Pat. Nos. 3,585,416; 3,764,748; 3,882,285; 5,142,186; 5,554,096; 5,624,376; 5,795,287; 5,800,336; 5,825,122; 5,857,958; 5,859,916; 5,888,187; 5,897,486; 5,913,815; 5,949,895; 6,005,955; 6,068,590; 6,093,144; 6,137,889; 6,139,488; 6,174,278; 6,190,305; 6,208,445; 6,217,508; 6,222,302; 6,241,767; 6,422,991; 6,475,134; 6,519,376; 6,620,110; 6,626,822; 6,676,592; 6,728,024; 6,735,318; 6,900,926; 6,920,340; 7,072,475; 7,095,981; 7,239,069; 7,289,639; D512,979; 2002/0086715; 2003/0142841; 2004/0234092; 2005/0020873; 2006/0107744; 2006/0233398; 2006/075175; 2007/0083078; 2007/0191673; 2008/0021518; 2008/0107292; commonly owned U.S. Pat. Nos. 5,259,032; 5,276,910; 5,425,104; 5,804,109; 6,084,975; 6,554,761; 6,629,922; U.S. Publication Nos. 2006/0023908; 2006/0189841; 2006/0251278; and 2007/0100197. Non-U.S. patents and publications that may be relevant include EP1845919 PCT Publication Nos. WO 03/063542; WO 2006/075175; U.S.

Publication Nos. Journal publications that may be relevant include: Ayatollahi et al., “Design and Modeling of Micromachines Condenser MEMS Loudspeaker using Permanent Magnet Neodymium-Iron-Boron (Nd—Fe—B)”, ISCE, Kuala Lampur, 2006; Birch et al, “Microengineered Systems for the Hearing Impaired”, IEE, London, 1996; Cheng et al., “A silicon microspeaker for hearing instruments”, J. Micromech. Microeng., 14(2004) 859-866; Yi et al., “Piezoelectric microspeaker with compressive nitride diaphragm”, IEEE, 2006, and Zhigang Wang et al., “Preliminary Assessment of Remote Photoelectric Excitation of an Actuator for a Hearing Implant”, IEEE Engineering in Medicine and Biology 27th Annual Conference, Shanghai, China, Sep. 1-4, 2005. Other publications of interest include: Gennum GA3280 Preliminary Data Sheet, “Voyager TDTM. Open Platform DSP System for Ultra Low Power Audio Processing” and National Semiconductor LM4673 Data Sheet, “LM4673 Filterless, 2.65 W, Mono, Class D audio Power Amplifier”; Puria, S. et al., Middle ear morphometry from cadaveric temporal bone micro CT imaging, Invited Talk. MEMRO 2006, Zurich; Puria, S. et al, A gear in the middle ear ARO 2007, Baltimore, MD.

BRIEF SUMMARY OF THE INVENTION

The present invention is related to hearing systems, devices and methods. Although specific reference is made to hearing aid systems, embodiments of the present invention can be used in many applications in which a signal is used to stimulate the ear.

Embodiments of the present invention provide improved hearing which overcomes at least some of the aforementioned limitations of current systems. In many embodiments, a device to transmit an audio signal to a user may comprise a transducer and a support. The support is configured for placement on the eardrum to couple the transducer to the umbo to drive the eardrum. The transducer can be positioned on the support to extend away from the umbo so as to decrease occlusion and lower mechanical impedance when the support is placed on the eardrum. For example, the transducer can be coupled to the support at an inner first location corresponding to a location of the eardrum at or near the umbo, and coupled to an outer second location corresponding to an outer portion of the eardrum or skin disposed over the bony process so as to decrease occlusion. The transducer can be coupled to the support with a conformable material so as to inhibit loading of the transducer and decrease occlusion when the support is coupled to the eardrum, and the conformable material can transmit substantially audible frequencies that correspond to hearing loss of the user, for example frequencies above about 1 kHz. The conformable material may comprise one or more of many materials such as a resilient material, a resilient spring material, a sponge material, a silicone sponge material, a viscous liquid, a viscoelastic material, or a viscoelastic memory foam, for example. The transducer may be very energy efficient, for example, by comprising an energy efficient electromagnetic balanced armature, and the support and transducer coupled to the eardrum can transmit sound very efficiently. Hearing devices making use of such an audio signal transmission device can have advantages such as longer battery life, smaller battery components, smaller size, and enhanced comfort while inhibiting or minimizing feedback and occlusion effects. The support and transducer can be coupled so as to receive an audio signal in the transducer may extend between the first location and the second location toward a bony part of the ear canal when the support is placed on the eardrum.

In many embodiments, the transducer is coupled to the support to support the transducer at the first location and the second location. The transducer may comprise a movable structure coupled to the support at the first location and configured to drive the eardrum at the first location in response to movement of the movable structure.

In many embodiments, a second movement at the second location is less than a first movement at the first location when the transducer drives the eardrum. The second movement at the second location may be no more than about 75% of the first movement of the first location when the transducer drives the eardrum.

In many embodiments, the device further comprises a first attachment structure affixed to the support at the first location. For example the first attachment structure may be embedded in the support at the first location to affix the attachment structure to the support. The first attachment structure is coupled to an elongate movable structure of the transducer. For example, the attachment structure may be affixed to the elongate movable structure. The elongate movable structure may comprise at least one of a reed or an armature configured to move in response to the audio signal.

In many embodiments, an extension structure extends from the elongate movable structure to the first attachment structure to couple the elongate movable structure to the first attachment structure. The device may further comprise a second attachment structure affixed to the support at a second location. The extension structure may comprise at least one of a tuning structure or a structure that does not flex substantially when the ear is driven. For example, the extension structure may comprise the tuning structure to tune a gain of the transducer in response to frequencies, and the tuning structure may be coupled to the support at the first location. The extension structure may comprise a structure that does not flex substantially when the ear is driven, for example a rod, and the rod can be composed of surgical grade stainless steel configured such that the rod does not flex substantially when the ear is driven. At least one of the extension structure or the first attachment structure may comprise a conformable material so as to decrease low frequency loading, for example static loading, of the transducer and occlusion when the transducer is coupled to the eardrum with the support. The conformable material may comprise one or more of a viscoelastic material or a viscous liquid.

The second attachment structure may be coupled to the transducer away from the elongate movable structure. The elongate movable structure may extend along a first elongate dimension and the second support may extend along a second dimension transverse to the first dimension. The first attachment structure may comprise at least one of a plate, a coil, a dome, a tripod, or a cone embedded in the support at the first location. The first attachment structure may comprise a maximum dimension across of no more than about 3 mm.

In many embodiments, the support is shaped to the eardrum of the user to align the transducer with the eardrum in a pre-determined orientation. A fluid may be disposed between the eardrum and the support to couple the support with the eardrum. The transducer may be positioned on the support to align an elongate dimension of the transducer with the malleus of the user when the support is placed on the eardrum. The transducer comprises an elongate structure configured to move in response to the audio signal. The elongate structure may be positioned on the support to align with a handle of the malleus of the user when the support is placed on the eardrum. The support may comprise a shape that corresponds to the eardrum of the user to couple the support to the eardrum with the predetermined orientation. For example, the support may comprise a shape from a mold of the eardrum of the user. The transducer may be positioned on the support such that an elongate dimension of the transducer extends along a handle of the malleus when the support is placed on the eardrum of the user. The transducer may be positioned on the support to align the transducer with the lateral process of the malleus when the support is placed on the eardrum.

In many embodiments, the transducer comprises at least one of an electromagnetic balanced armature transducer, a piezoelectric transducer, a magnetostrictive transducer, a photostrictive transducer, an electrostatic transducer, a coil or a magnet. A transducer may comprise the electromagnetic balanced armature transducer, and the balanced armature transducer may comprise an armature configured to move in response to a magnetic field. The armature may be positioned on the support and the coupled to the first location to balance the armature when the support is placed on the eardrum of the user. The device may further comprise an extension structure coupled to the armature and the first location. The extension structure can extend from the armature to the first location along a distance within a range from about 0.5 mm to about 2.0 mm to balance the armature when the support is placed on the eardrum. The extension structure may comprise at least one of a substantially non-flexible structure or a tuning structure.

In many embodiments, at least one of the extension structure or the first attachment structure comprises a conformable viscoelastic material to decrease low frequency loading, for example static loading, of the transducer and occlusion when the transducer is coupled to the eardrum with the support. For example, the extension structure may comprise the conformable material, the attachment structure may comprise the conformable material, or both the extension structure and the attachment structure may comprise the conformable viscoelastic material. The conformable material may comprise one or more of an elastic material, a viscous material or a viscoelastic material.

The armature may extend along a first elongate dimension and the extension structure can extend along a second elongate dimension transverse to the first dimension. The balanced armature transducer may comprise an armature having at least one of a mass, a damping or a stiffness and the at least one of the mass, the damping or the stiffness is configured to match at least one of a mass, a damping or a stiffness of the support and the eardrum when the support is placed on the eardrum.

In many embodiments, the balanced armature transducer is adapted to drive the support when the support is coupled to the eardrum. The balanced armature transducer may be adapted to drive the support by optimization of at least one of an output mechanical impedance of the armature matched to an input mechanical impedance of the support, a size of the balanced armature transducer, a length of the balanced armature transducer, an electrical impedance of the balanced armature transducer, materials from which the balanced armature transducer is made, a spring constant of a restoring member coupled to the armature of the balanced armature transducer to restore the armature to a neutral position, a number of turns of a wire of a coil wrapped around the armature of the balanced armature transducer, a moment of inertia of the balanced armature, a countermass on the balanced armature opposite the support to balance a mechanical load of the support, or a diameter of the wire of the coil wrapped around the armature of the balanced armature transducer.

In many embodiments, the transducer and the support may be configured to provide a sound output of at least 80 dB (SPL) and no more than 5% distortion at 10 kHz with no more than about 1 mW of electrical power input to the transducer. In some embodiments, the transducer and the support may be configured to provide the sound output of at least 80 dB (SPL) with no more than 5% distortion over a range from about 100 Hz to about 10 kHz with the no more than about 1 mW of electrical power input to the transducer.

In many embodiments, the device may further comprise a casing affixed to the body of the transducer and circuitry coupled to the transducer to drive the transducer. The circuitry is supported with the support when the support is placed on the eardrum. The support, the casing, the transducer and the circuitry comprise a combined mass of no more than about 120 mg, in which the transducer is positioned on the support such that the combined mass when the support is positioned on the eardrum corresponds to a mass of no more than about 60 mg at the umbo. This placement of the transducer can substantially decrease occlusion perceived the user. In some embodiments, the support, the casing, the circuitry, and the transducer comprise a combined mass of no more than about 80 mg, in which the transducer is positioned on the support such that the combined mass when the support is positioned on the eardrum corresponds to a mass of no more than about 40 mg at the umbo.

In many embodiments, the device further comprises at least one photodetector coupled to the transducer. The at least one photodetector comprises an output impedance. The transducer comprises a balanced armature transducer comprising an input impedance. The output impedance of the at least one photodetector matches the input impedance of the balanced armature transducer. In many embodiments, the at least one photodetector comprises a photovoltaic transducer.

In many embodiments, the transducer is electrically coupled to at least one of a coil, an electrical connection, an output amplifier or a sound processor.

In another aspect, embodiments of the present invention provide a method of transmitting an audio signal to a user. The user has an ear comprising an eardrum and a malleus connected to the ear drum at an umbo. The method comprises supporting a transducer with a support positioned on the eardrum, and vibrating the support and the eardrum with the transducer positioned away from the umbo. The transducer may be coupled to the support at a first location and a second location. The first location corresponds to the umbo and the transducer drives the umbo from the first location. The second location is spaced apart from the first location such that the second location moves less than the first location when the transducer drives the umbo.

In another aspect, embodiments of the present invention provide a method of transmitting an audio signal to a user. The user has an ear comprising an eardrum and a malleus connected to the ear drum at an umbo. A support is placed on the eardrum of the user to couple the transducer to the umbo to drive the eardrum. The transducer is coupled to the support at first location and a second location.

In another aspect, embodiments of the present invention provide a method of manufacturing a device to transmit an audio signal to a user. The user has an ear comprising an eardrum. A support is configured to fit the eardrum of the user. A transducer is positioned to couple to a first location of the support and a second location of the support. The first location is separated from the second location by at least about 1 mm. The support may be formed with a mold to fit the eardrum of the user.

The transducer may be affixed to the support with a first attachment structure at the first location and a second attachment structure at the second location.

In many embodiments, the transducer comprises an elongate movable structure configured to move in response to a magnetic field. The first attachment structure is affixed to the elongate movable structure with an extension structure, for example a post, extending from the attachment structure to the elongate movable structure. The elongate movable structure may comprise at least one or a reed or an armature of a balanced armature transducer.

In many embodiments, a liquid is placed against the mold and solidifies to form the support. The transducer may be supported with the mold when the liquid solidifies. The transducer may comprise a balanced armature and the transducer may be supported with the mold when the liquid solidifies to balance the armature such that the armature is balanced when the support is placed on the eardrum of the user. The liquid may comprise at least one of a silicone, a hydrogel, or collagen.

In many embodiments, the transducer comprises a balanced armature transducer optimized to drive a load of the support coupled to the eardrum. The balanced armature transducer may be optimized by optimizing at least one of a size of the balanced armature transducer, a geometry of the balanced armature transducer, an electrical impedance of the balanced armature transducer, materials from which the balanced armature transducer is made, ferrofluid disposed in a cavity between poles of a magnet of the transducer, a spring constant of a restoring member coupled to the armature of the balanced armature transducer to restore the armature to a neutral position, a number of turns of a wire of a coil wrapped around the armature of the balanced armature transducer, or a diameter of the wire of the coil wrapped around the armature of the balanced armature transducer.

In another aspect, embodiments of the present invention provide a device to transmit an audio signal to a user, in which the user has an ear comprising an eardrum and a malleus. The device comprises a transducer and a support. The transducer is configured to drive the eardrum. The support is configured for placement at least partially on the eardrum to support the transducer.

In many embodiments, the eardrum comprises an annulus and the support is configured for placement at least partially on the annulus of the eardrum to decrease occlusion.

In many embodiments, the support comprises a recess sized to decrease contact with a portion of the eardrum disposed along a portion of the malleus when the support is placed at least partially on the eardrum. The recess can be sized to decrease a user perceptible interference of the support with blood flow to the eardrum.

In many embodiments, the support is configured to couple the eardrum with a predetermined orientation to position the recess at least partially over a portion of the malleus.

In many embodiments, the support comprises an outer portion and the transducer is coupled to the outer portion to decrease occlusion, and the recess extends at least partially into the outer portion. The transducer may comprise a housing affixed to the outer portion and a vibratory structure. The vibratory structure may be disposed at least partially within the housing and extend inwardly away from the outer portion to couple to an inner portion of the eardrum. The inner portion may comprise the umbo.

In many embodiments, at least one of an elastic structure or a spring connected to the outer portion and the transducer to urge the transducer toward the eardrum and couple the transducer to the eardrum when the outer portion is coupled at least partially to the eardrum.

In many embodiments, the transducer is coupled to the outer portion away from the recess.

In many embodiments, the outer portion is configured to contact skin disposed over a bony portion of the ear canal.

In many embodiments, the outer portion comprises an O-ring sized to fit the along a periphery of the eardrum and wherein the O-ring comprises the recess.

In many embodiments, the device further comprises at least one electromagnetic energy receiver configured to receive electromagnetic energy and convert the electromagnetic energy to electrical energy to drive the transducer. The electromagnetic energy receiver can be affixed to the outer portion to decrease occlusion and coupled the transducer to transmit sound to the user in response to electromagnetic energy. The electromagnetic energy may comprise light. The at least one electromagnetic energy receiver may comprise at least one photodetector affixed to the outer portion to decrease occlusion and coupled the transducer to transmit sound to the user in response to the light.

In many embodiments, at least one optical component is affixed to the support and oriented toward the at least one photodetector to at least one of refract, diffract or reflect light from the optical component toward the at least one photodetector. The optical component may comprise one or more of a lens, Fresnel lens, a refractive lens, a cylindrical lens, a diffractive lens, a diffractive optic, a reflective surface, a mirror, a prism, an array of lenses, an array of lenses, an array of cylindrical lens, an array of mirrors or an array of prisms.

In many embodiments, the support comprises an inner portion and the outer portion comprises an opening sized to receive the inner portion. The inner portion can be configured to couple to an inner portion of the eardrum, for example near the umbo, and the inner portion sized smaller than the opening to couple to the transducer through the opening.

In many embodiments, the support comprises an inner portion, and the outer portion comprises an opening sized to receive an elongate movable structure extending from the transducer to the second support to couple to the transducer to the second support through the opening. The inner portion is configured for placement over an inner portion of the eardrum to drive the eardrum. The inner portion may comprise the umbo.

In many embodiments, the transducer is coupled to the support at a location on the support such that the location is positioned away from a lateral process of the malleus or a bony part of the external ear canal when the support is placed on the eardrum.

In many embodiments, the transducer comprises a movable structure coupled to the support at an inner location and configured to drive the eardrum from the inner location in response to movement of the movable structure.

In many embodiments, the support is configured to extend over a portion of malleus along a first direction and extend along a second direction transverse to the second direction, and the support comprises a first length in the first direction and a second length in the second direction, the first length less than the second length. The support can extend to the recess in the first direction, and a portion of an outer boundary of the support may define the recess. The transducer may comprise a magnet affixed to the support to vibrate the support in response to a magnetic field.

In many embodiments, the transducer comprises at least one of an electromagnetic balanced armature transducer, a piezoelectric transducer, a magnetostrictive transducer, a photostrictive transducer, an electrostatic transducer, a coil or a magnet.

In many embodiments, the transducer is electrically coupled to a amplifier circuitry with at least one electrical conductor extending between the transducer and the amplifier to couple the transducer to the amplifier. The device may comprise a module, and the module may comprise a microphone and the amplifier circuitry and a connector. The module can be sized to fit in the ear canal to couple to the amplifier circuitry to the transducer with the connector when the module is positioned in the ear canal. The module may be configured to disconnect from the connector such that the support is positioned in the ear canal at least partially against the eardrum when the module is removed.

In another aspect, embodiments of the present invention provide a method of providing an audio device to a user, in which the user has an ear comprising an eardrum and a malleus. A support is provided, and the support has a transducer supported thereon and a recess sized to decrease contact with blood vessels of the eardrum. The support is placed at least partially on the eardrum, and the support is placed on the eardrum such that the recess aligned with the blood vessels of the eardrum.

In another aspect, embodiments of the present invention provide a device to transmit an audio signal to a user, in which the user has an ear comprising an eardrum. The device comprises a transducer configured to drive the eardrum, and a support comprising an outer portion and an inner portion. The outer portion comprises a stop configured to limit medial displacement of the support into the ear, and the inner portion is configured to couple the transducer to the eardrum.

In many embodiments, at least one structure is coupled to the transducer and the inner portion. The at least one structure can be configured to urge the inner portion toward the eardrum to couple the transducer to the eardrum when the stop is positioned against at least one of an outer portion of the eardrum or skin of the ear canal proximal to the outer portion of the eardrum.

In many embodiments, a module is configured to insert into the ear canal, in which the module comprises a microphone, a power supply and amplifier circuitry coupled to the microphone. The module may comprise a first connector configured to contact a second connector affixed to the support, so as to couple electrically the circuitry of the module with the transducer on the support, such that the module can be removed without the support and transducer when the support is coupled to the eardrum. Alternatively, the module may comprise the transducer, the stop and the support, and the support can be affixed to a distal end of the module.

In another aspect, embodiments of the present invention provide a device to transmit a sound to a user having an eardrum. The device comprises a support configured to couple to the eardrum, a first transducer and a second transducer. The first transducer is configured to couple at least an inner portion of the support to the eardrum. The second transducer is configured to vibrate the at least the inner portion of the support to transmit the sound when the at least the inner portion is coupled to the eardrum.

In another aspect, embodiments of the present invention provide a method of transmitting a sound to a user having an eardrum. A support is provided to the user, and the support coupled to a first transducer and a second transducer. At least an inner portion of the support is coupled to the eardrum with the first transducer. The at least the inner portion of the support is vibrated with the second transducer to transmit the sound when the at least the inner portion is coupled to the eardrum.

In another aspect, embodiments of the present invention provide a device to transmit a sound to a user having an eardrum. The device comprises a support configured to couple to the eardrum. A transducer is coupled to the support, and a conformable structure is coupled the support and the transducer to transmit the sound to the user.

In many embodiments, the conformable structure is configured to decrease low frequency loading of the transducer when the support is coupled to the eardrum and to transmit substantially frequencies of the sound above about 1 kHz when the support is coupled to the eardrum.

In another aspect, embodiments of the present invention provide a method of transmitting a sound to a user having an eardrum. The method comprises positioning a support on the eardrum to couple a transducer to the eardrum. A conformable structure is coupled the support and the transducer to transmit the sound to the user.

In another aspect, embodiments of the present invention provide a device to transmit an audio signal to a user. The device comprises transducer means and support means coupled to the transducer means to vibrate the ear in response to the signal.

BRIEF DESCRIPTION OF THE DRAWINGS

FIGS. 2C1 to 2C4 show views of the balanced armature transducer as in FIGS. 2 and 2A;

FIG. 4 shows a photovoltaic input transducer coupled to a balanced armature transducer according to embodiments of the present invention;

FIG. 4A shows an input transducer inductively coupled to a balanced armature transducer according to embodiments of the present invention;

FIG. 4A1 shows the coils as in FIG. 4A positioned in the ear canal;

FIGS. 5A1, 5B1, and 5C1 show top views of the armature post end portions of FIGS. 5A, 5B, and 5C, respectively;

FIG. 8C shows a support comprising a concave surface with a shape configured so as to define a recess, according to embodiments of the present invention;

FIG. 8D shows a support having a recess and at least one structure to couple the transducer to the eardrum, according to embodiments of the present invention;

FIG. 8D1 shows the support of FIG. 8D with the at least one structure in an unloaded configuration prior to placement against the eardrum;

FIG. 8D2 shows the support of FIG. 8D with the at least one structure in a loaded configuration when the support is positioned against the eardrum;

FIG. 8D3 shows a post comprising the at least one structure configured to urge the support toward the eardrum;

FIG. 8E1 shows a medial view of a support having an outer portion comprising an O-ring and a flange extending from the O-ring configured for placement at least partially over an outer portion of the eardrum comprising the annulus and an inner portion configured for placement over an inner portion of the eardrum to drive the eardrum with the inner portion;

FIG. 8E2 shows a side view of the assembly as in FIG. 8E1;

FIG. 9B shows a support comprising at least one rigid support structure configured to extend substantially across the eardrum, for example to locations on the support corresponding to the skin disposed on substantially opposite sides of the ear canal, according to embodiments of the present invention;

FIG. 9B1 shows a side view of the support as in FIG. 9B in a first configuration;

FIG. 9B2 shows a side view of the support as in FIG. 9B in a second configuration configured to couple to the eardrum;

FIGS. 9C1 and 9C2 shows side and top views, respectively, of a support comprising at least one rigid structure coupled to a transducer with pivot coupling, in accordance with embodiments of the present invention;

FIG. 9D1 shows transducer reed coupled to a support with a viscous material disposed therebetween, so as to inhibit low frequency loading, for example static loading, of the transducer when the support is coupled to the eardrum, in accordance with embodiments of the present invention;

FIG. 9D2 shows a transducer reed coupled to a support with a viscous liquid so as to inhibit low frequency loading, for example static loading, of the transducer and occlusion when the support is coupled to the eardrum, in accordance with embodiments of the present invention;

DETAILED DESCRIPTION OF THE INVENTION

Embodiments of the present invention can provide hearing devices which directly couple to at least one of the eardrum or the ossicles such that the user perceives sound with minimal occlusion and feedback, and with improved audio signal transmission. The systems, devices, and methods described herein may find application for hearing devices, for example open ear canal hearing aides. Although specific reference is made to hearing aid systems, embodiments of the present invention can be used in any application in which an audio signal is received, for example, optically or electromagnetically, and converted into a mechanical output.

As used herein, the umbo of the eardrum encompasses a central portion of the eardrum coupled to the malleus and that extends most medially along the ear canal.

Figure 1:
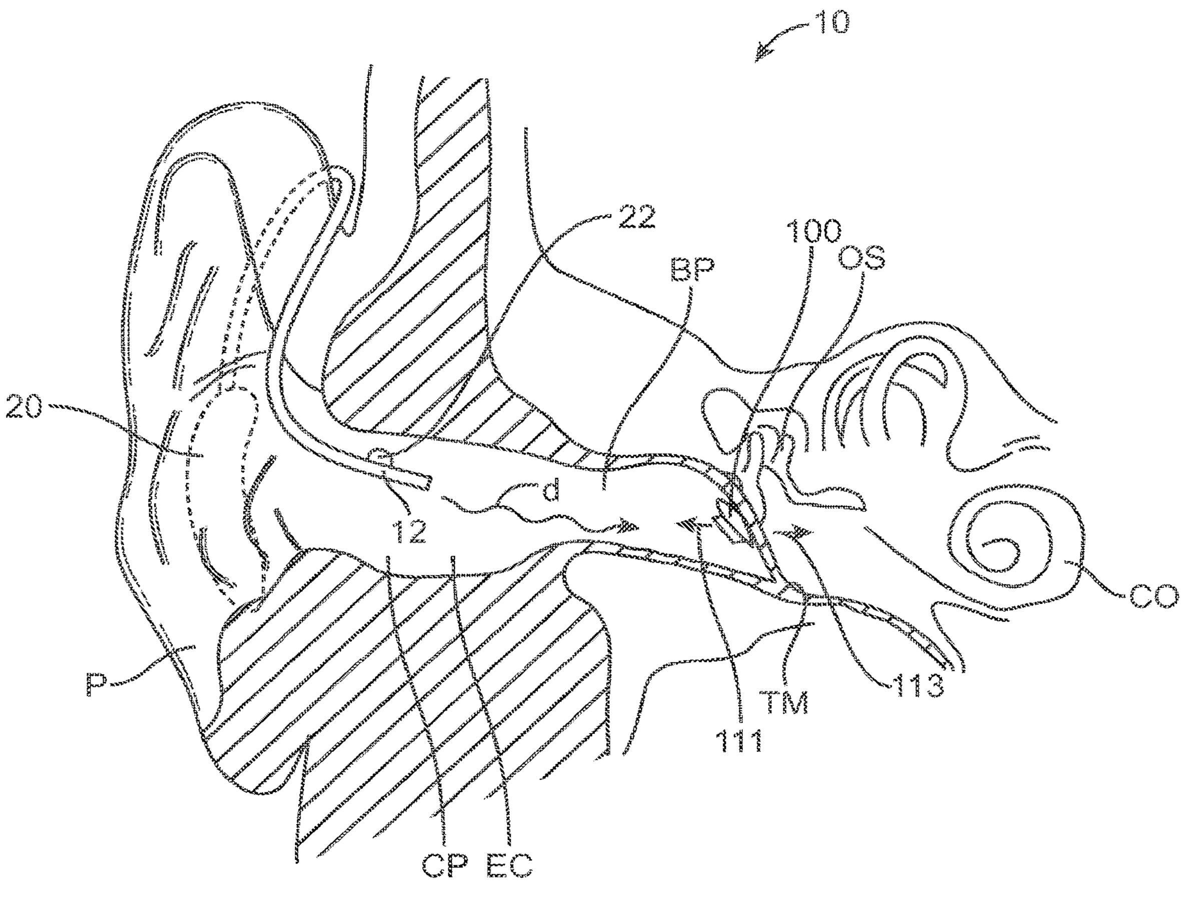
FIG. 1 shows a cross-sectional view of an ear coupled with an output transducer assembly of an audio system according to embodiments of the invention.

FIG. 1 shows the anatomy of an ear and an audio signal transmission system 10 comprising an output transducer assembly 100 coupled to the ear according to embodiments of the invention. The outer ear comprises the pinna P and the outer, lateral portion of the ear canal EC. The ear canal EC comprises a lateral, cartilaginous portion CP and a medial, bony part BP. The cartilaginous portion CP of the ear canal EC is flexible and will typically move during movements of the jaw. Cerumen is produced by the cartilaginous portion CP of the ear canal. The body portion BP of the ear canal has a very thin layer of skin and is sensitive to touch. Movements of the jaw will not move the bony part BP of the ear canal. At the medial end of the ear canal EC is eardrum or tympanic membrane TM. Sound can cause vibrations of the eardrum TM, for example, movement of the eardrum TM in a first direction 111 and a second direction 113 opposite the first direction 111. Vibrations of the eardrum TM can vibrate the ossicles OS which in turn can vibrate fluid inside the cochlea CO to cause sensations of sound.

Output transducer assembly 100 may have at least a portion of the device coupled to eardrum TM. Output transducer assembly 100 may comprises an output transducer 130 positioned on support and configured to vibrate in response to audio signals. Based on received signals, output transducer assembly 100 can vibrate the eardrum TM in opposing first direction 111 and second direction 113 to produce a sound output. The received signals will typically be based on an original sound input and may be from a light source such as an LED or a laser diode, an electromagnet, an RF source, or the like. To produce a mechanical vibration on the eardrum TM, output transducer assembly 100 may comprise a coil responsive to the electromagnet, a magnetostrictive element, a photostrictive element, a piezoelectric element, an electromagnetic balanced armature, or the like. When properly coupled to the subject's hearing transduction pathway, the mechanical vibrations caused by audio signal transmission device can induce neural impulses in the subject which can be interpreted by the subject as the original sound input.

Hearing system 10 may comprise an input transducer assembly, for example, a completely-in-the-canal unit or a behind-the-ear unit 20. Behind-the-ear unit 20 may comprise many components of system 10 such as a speech processor, battery, wireless transmission circuitry, and the like. Output transducer assembly 100 will typically be configured to receive signals from the input transducer assembly, for example, the behind-the-ear unit 20. Behind-the-ear unit 20 may comprise many components as described in U.S. Pat. Pub. Nos. 2007/0100197, entitled "Output transducers for hearing systems;" and 2006/0251278, entitled "Hearing system having improved high frequency response." The input transducer assembly may be located at least partially behind the pinna P or other sites such as in pinna P or entirely within ear canal EC. The input transducer assembly can receive a sound input, for example an audio sound. With hearing aids for hearing impaired individuals, the input can be ambient sound. The input transducer assembly comprises an input transducer, for example, a microphone 22 which may be positioned in many locations such as behind the ear, if appropriate. Microphone 22 is shown positioned within the ear canal EC near its opening to detect spatial localization cues from the ambient sound. The input transducer assembly can include a suitable amplifier or other electronic interface. The input received by the input transducer assembly may comprise an electronic sound signal from a sound producing or receiving device, such as a telephone, a cellular telephone, a Bluetooth connection, a radio, a digital audio unit, and the like.

Hearing system 10 can include a signal output source 12. The signal output source 12 can produce an output based on a sound input. The output source 12 may comprise a light source such as an LED or a laser diode, an electromagnet, an RF source, or the like. The signal output source can produce an output based on the sound input. Output transducer assembly 130 comprising output transducer 130 can receive the output source and can produce mechanical vibrations in response. Output transducer 130 may comprise a coil responsive to the electromagnet, a magnetostrictive element, a photostrictive element, a piezoelectric element, or the like. When properly coupled to the subject's hearing transducer pathway, the mechanical vibrations caused by output transducer 130 can induce neural impulses in the subject which can be interpreted by the subject as the original sound input.

Figure 1A:
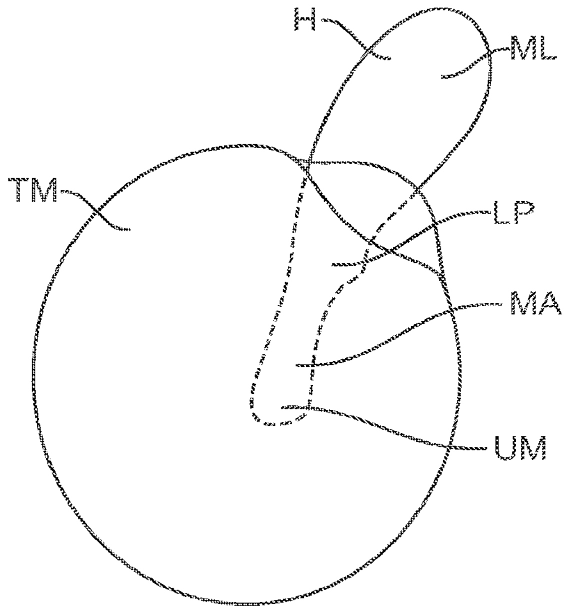
FIG. 1A shows a front view of the lateral side of the tympanic membrane suitable for placement with the output transducer assembly of FIG. 1.
Figure 1B:
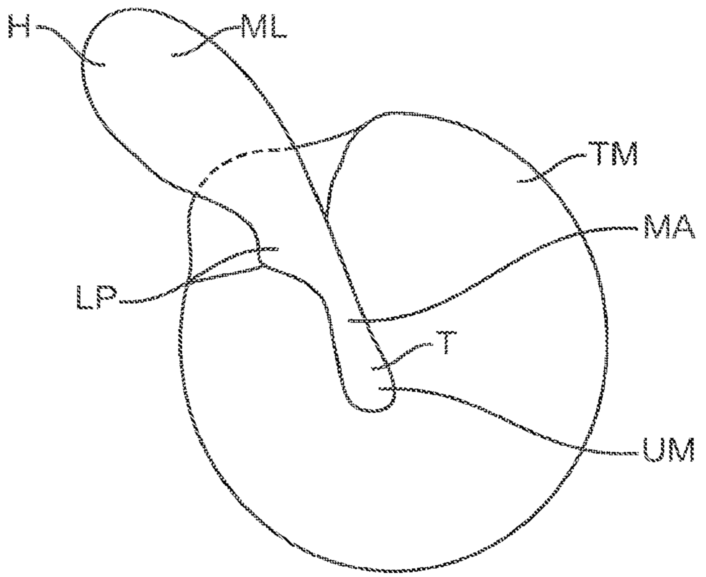
FIG. 1B shows a front view of the medial side of the tympanic membrane suitable for alignment with the output transducer assembly of FIG. 1.

FIGS. 1A and 1B show structures of the ear suitable for placement of the output transducer assembly 100. FIG. 1A shows these structures from the lateral side of the eardrum TM, and FIG. 1B shows these structures from the medial side of the eardrum TM. The eardrum TM is connected to a malleus ML. Malleus ML comprises a head H, a handle or manubrium MA, a lateral process LP, and a tip T. Manubrium MA is disposed between head H and tip T and coupled to eardrum TM, such that the malleus ML vibrates with vibration of eardrum TM.

Figure 1C:
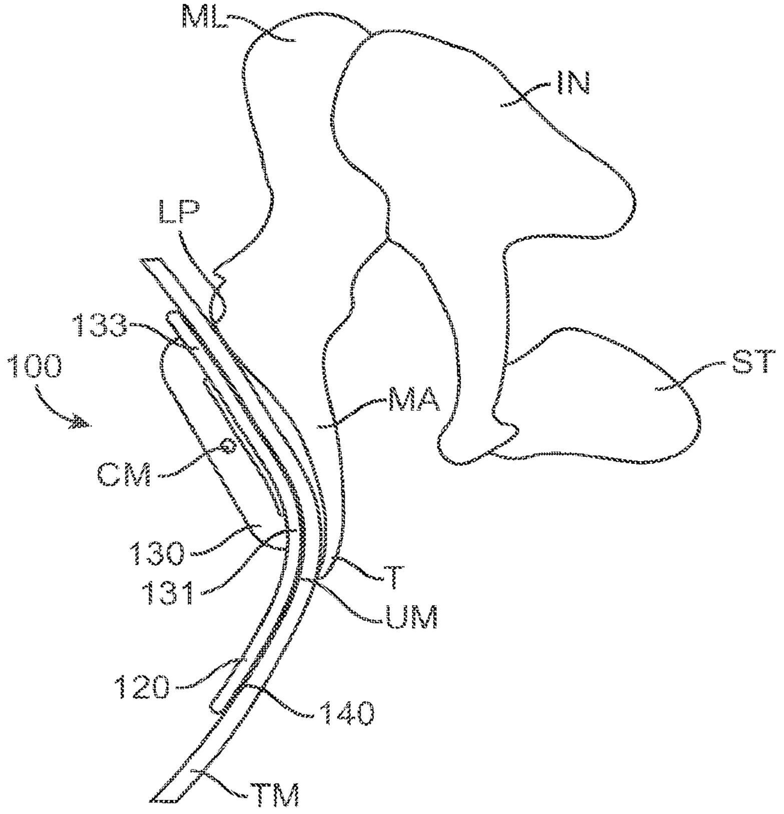
FIG. 1C shows a side view of the output transducer of FIG. 1 coupled to the tympanic membrane.

FIG. 1C show structures of the ossicles OS and the eardrum TM suitable for alignment with output transducer assembly 100. Ossicles OS comprise the malleus ML, incus IN, and stapes ST. The eardrum TM comprises the umbo UM.

Figure 1D:
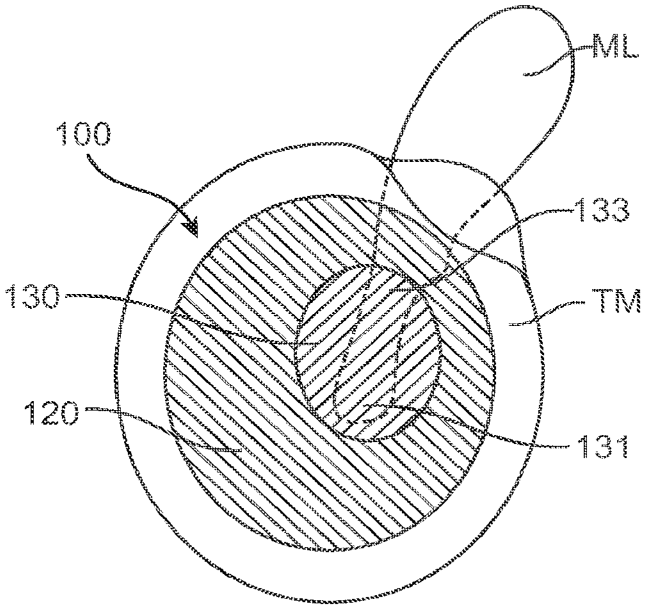
FIGS. 1D and 1E show front views of the output transducer of FIG. 1 coupled with the lateral side of the tympanic membrane.

FIG. 1D shows the lateral side of the eardrum TM with a coupled output transducer assembly 100. As shown in FIGS. 1C and 1D, the output transducer assembly 100 comprises a transducer 130 and a support 120. Generally, the transducer 130 is positioned on the support 120 to extend away from the umbo UM. As shown in FIG. 1D, the transducer 130 may be an elongate structure positioned on the support 120 such that it extends away from the umbo UM and is aligned with the malleus ML, e.g., by extending along the handle or manubrium MA of the malleus ML. A fluid 140 may be disposed between the eardrum TM and the support 120 to couple the support 120 with the eardrum TM. The fluid 140 may be, for example, an oil, a mineral oil, a silicone oil, a hydrophobic liquid, or the like.

The transducer 130 is coupled to the support 120 at a first location 131 and at a second location 133. The first location 131 may correspond to the location of the umbo UM and be spaced away from the second location 133 by at least about 1 mm. As shown in FIG. 1D, the second location 133 may correspond to the short or lateral process LP of the malleus ML. Transducer 130 may comprise an elongate dimension extending between the first location 131 and the second location 133. The elongate dimension may be within a range from about 2 mm to about 4 mm. The support 120 supports the transducer 130 on the eardrum TM. The support 120 may comprise a support, housing, mold, or the like shaped to conform with the shape of the eardrum TM. The support 120 may comprise silicone, hydrogel, collagen, or other biocompatible materials.

Transducer 130 comprises a center of mass CM. Transducer 130 can be positioned on support 130 such that the transducer center of mass CM is positioned on the support away from the umbo when the support is placed on the eardrum TM. The transducer can extend away from the umbo such that the center of mass CM is located away from the umbo. For example, the center of mass CM can be positioned way from the umbo such that the center of mass is aligned with a handle of the malleus. The transducer may extend away from the umbo toward the wall of the ear canal and away from the malleus such that the center of mass is positioned between the umbo and the wall of the ear canal away from the malleus when the support is placed against the ear canal.

Alternatively to positioning the second location 133 on the support so as to correspond to the lateral process LP, the second location of the support may correspond to a location of the eardrum away from the lateral process LP, so as to decrease interference from blood flow. Blood vessels can extend within eardrum TM along the malleus toward the umbo. The second location can be positioned to correspond to portions of the eardrum away from the blood vessels that extend along the malleus toward the umbo. For example, the second location 133 can be positioned on the support to extend along the tympanic membrane in an anterior posterior direction, a posterior anterior direction, or an inferior superior direction. The transducer may comprises an elongate dimension extending between the first location and the second location, and the elongate dimension of the transducer can be within a range from about 2 mm to about 5 mm.

Figure 1E:
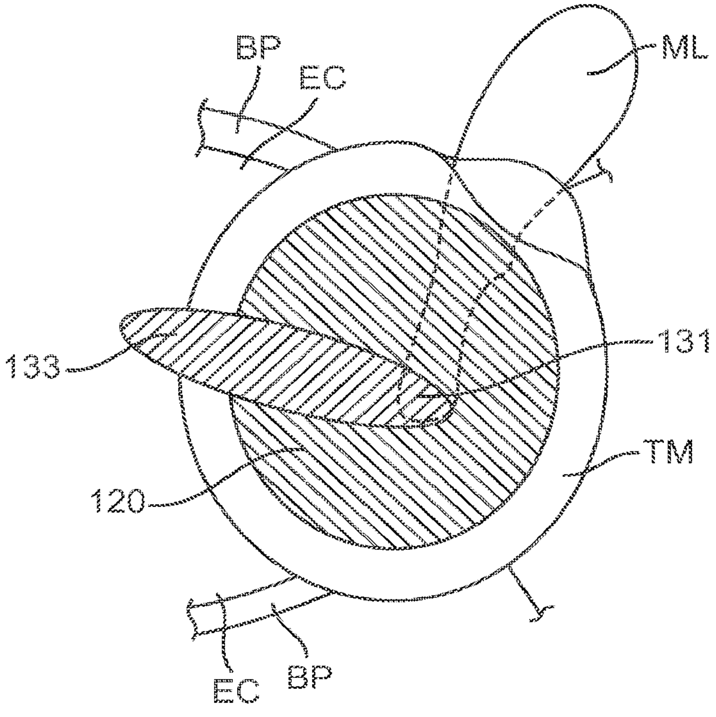
Figure 1F:
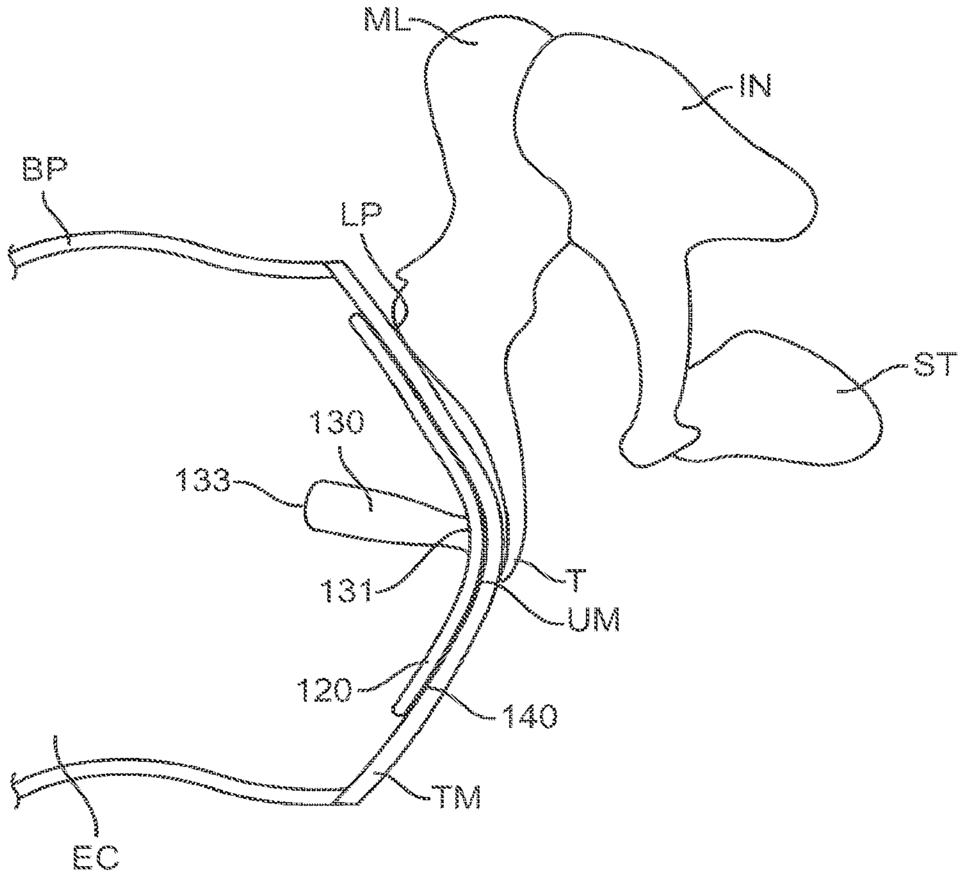
FIG. 1F shows a side view of the output transducer of FIG. 1 coupled to the tympanic membrane and the ear canal.

FIGS. 1E and 1F show embodiments in which the transducer 130 extends away from the umbo UM toward other parts of the ear. FIG. 1E show structures of the ossicles OS and the eardrum TM. FIG. 1F shows the lateral side of the eardrum TM with a coupled output transducer assembly 100. The first location 131 may correspond to a location on the eardrum TM, for example, the umbo UM or the lateral process LP. Skin SK is located between the bony part BP and the ear canal EC, such that an outer surface of the skin defines the outer boundary of the ear canal. The second location 133 may correspond to the bony tissue of the bony part BP of the ear canal EC. The elongate dimension extending between the first location 131 and the second location 133 may be within a range of about 4 mm to about 8 mm. Specific points of attachment of devices to the eardrum TM are described in prior U.S. Pat. Nos. 5,259,032; and 6,084,975, the full disclosures of which are incorporated herein by reference and may be suitable for combination with some embodiments of the present invention.

The transducer 130 can extend away from the umbo UM and away from visible blood vessels of the eardrum so as to decrease interference from the blood vessels that may extend along the malleus.

Output transducer assembly 100 can be very energy efficient. The transducer 130 and the support 120 may be configured to provide a sound output of at least 80 dB (SPL) with no more than 5% distortion at 10 kHz with no more than about 1 mW of electrical power input to the transducer 130. The transducer 130 and the support 120 may be configured to provide the sound output of at least 80 dB (SPL) with no more than 5% distortion over a range from about 100 Hz to about 10 kHz with the no more than about 1 mW of electrical power input to the transducer 130. These amounts of efficiency can extend the battery life of the output transducer assembly 100 when the output transducer assembly is coupled to an input transducer assembly, for example, at least one of optically coupled or electromagnetically coupled or electrically coupled, as described herein.

Figure 2:
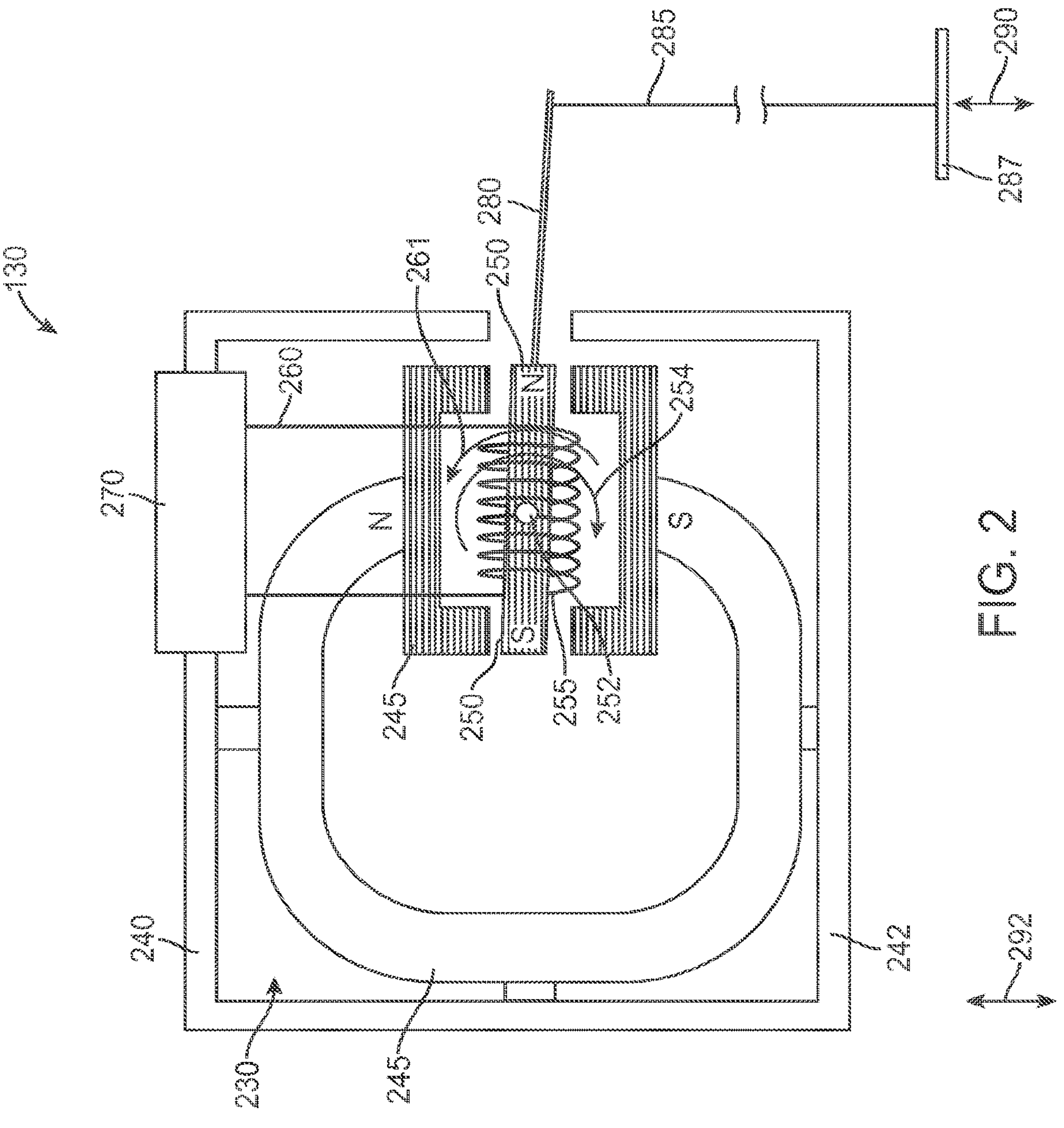
FIG. 2 shows a cross-sectional view of a balanced armature transducer of an output transducer according to embodiments of the present invention.

Referring now to FIG. 2, the transducer 130 of the output transducer assembly 100 may comprise an electromagnetic balanced armature transducer 230. The balanced armature transducer 230 comprises a permanent magnet 245 and a balanced armature 250. The balanced armature 250 pivots about a pivot point 252 and is wrapped by a coil 255. The coil 255 is linked to an input element 270 through wires 260. The input element 270 may comprise at least one photodetector, a coil, and electrical connector, or a combination thereof. The input element 270 comprises circuitry which may be configured to receive and process input signals from an external input unit. The output transducer assembly 100 may further comprise a casing 240 and the balanced armature transducer 230 will typically be rigidly affixed to the casing 240. The balanced armature 250 may comprise a reed 280, for example a reed extending out of the casing 240. In many embodiments, the reed of the armature comprises a vibrator consisting of a thin strip of stiff material that vibrates in response to the magnetic field. The reed 280 is coupled to a reed post 285. The reed 280 may extend along a first dimension while the reed post 285 may extend along a second dimension offset from the first dimension. As shown in FIG. 2, reed post 285 can be perpendicular to reed 280 an may extend at other angles. The reed post 285 may have flexible components as described below. The end portion 287 of the reed post 285 will typically be wider than the remainder of the reed post 285 and will typically be configured to couple to the support 120 at the first location 131. The reed post 285 may extend from the armature to the first location 131 along a distance from about 0.5 mm to about 0.5 mm and balance the reed 280 and armature 250 when the support 120 is placed on the eardrum TM. The balanced armature transducer 230 may comprise a balanced armature transducer commercially available from Knowles Electronics of Itasca, IL; Sonion A/S of Denmark; and similar vendors.

The balanced armature 250 can be precisely centered or “balanced” in the magnetic field of the permanent magnet 245. As shown in FIG. 2, balanced armature 250 is balanced between the poles of the permanent magnet 245. The balanced armature 250 is coupled to casing 240 or another component of balanced armature transducer 230 so that the balanced armature 250 pivots about a central portion of the balanced armature 250. When the input element 270 receives an input signal, the input element 270 runs a current through the coil 255, magnetizing the balanced armature 250 in a first polarization. Magnetic attraction and repulsion between permanent magnet 245 and magnetized balanced armature 250 causes the magnetized balanced armature 250 to rotate slightly in a direction 254 as shown in FIG. 2. A current may be run through coil 255 to magnetize balanced armature 250 with a second polarization opposite the first polarization, causing the balanced armature 250 to rotate slightly in an opposite direction. The rotations of the armature 250 move the reed 280, thereby driving the reed post 285 in opposite directions 290. The reed post 285 drives and vibrating the eardrum TM when the post end portion 287 is coupled to support 120. As described above, the support 120 can be coupled to the eardrum TM at the first location 131, which typically corresponds to the umbo UM. A restoring member 261, which may be a counter spring or an elastic element, may be provided to restore the balanced armature 250 in the precisely centered or “balanced” position when balanced armature 250 is no longer magnetized, i.e., a current is no longer run through coil 255. The restoring member 261 may be coupled the balanced armature 250 and to the permanent magnet 245.

Figure 2A:
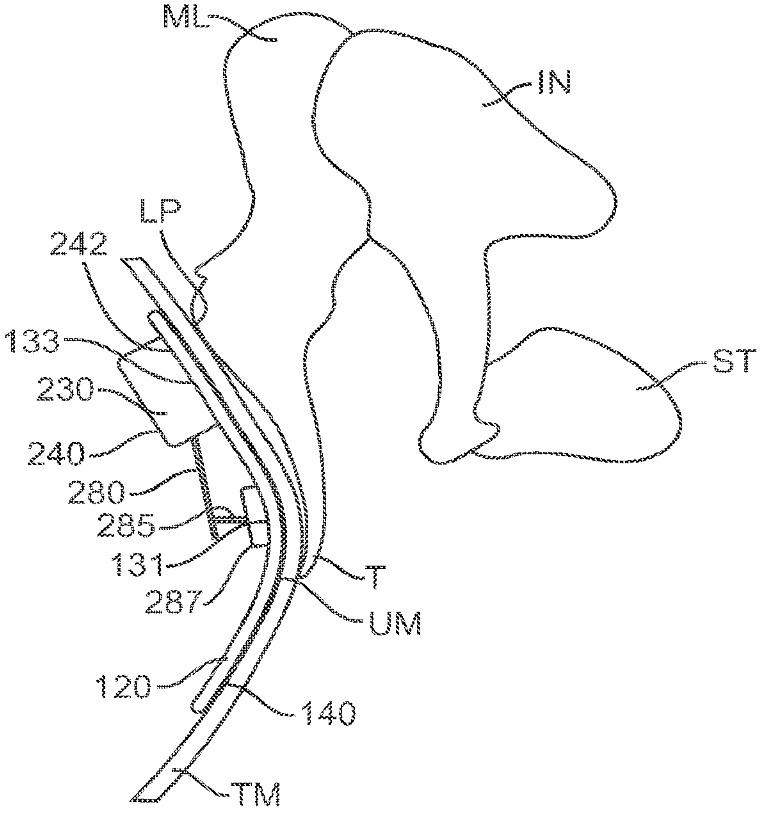
FIGS. 2A and 2B show side views of a balanced armature output transducer as in FIG. 2 coupled to the tympanic membrane.
Figure 2B:
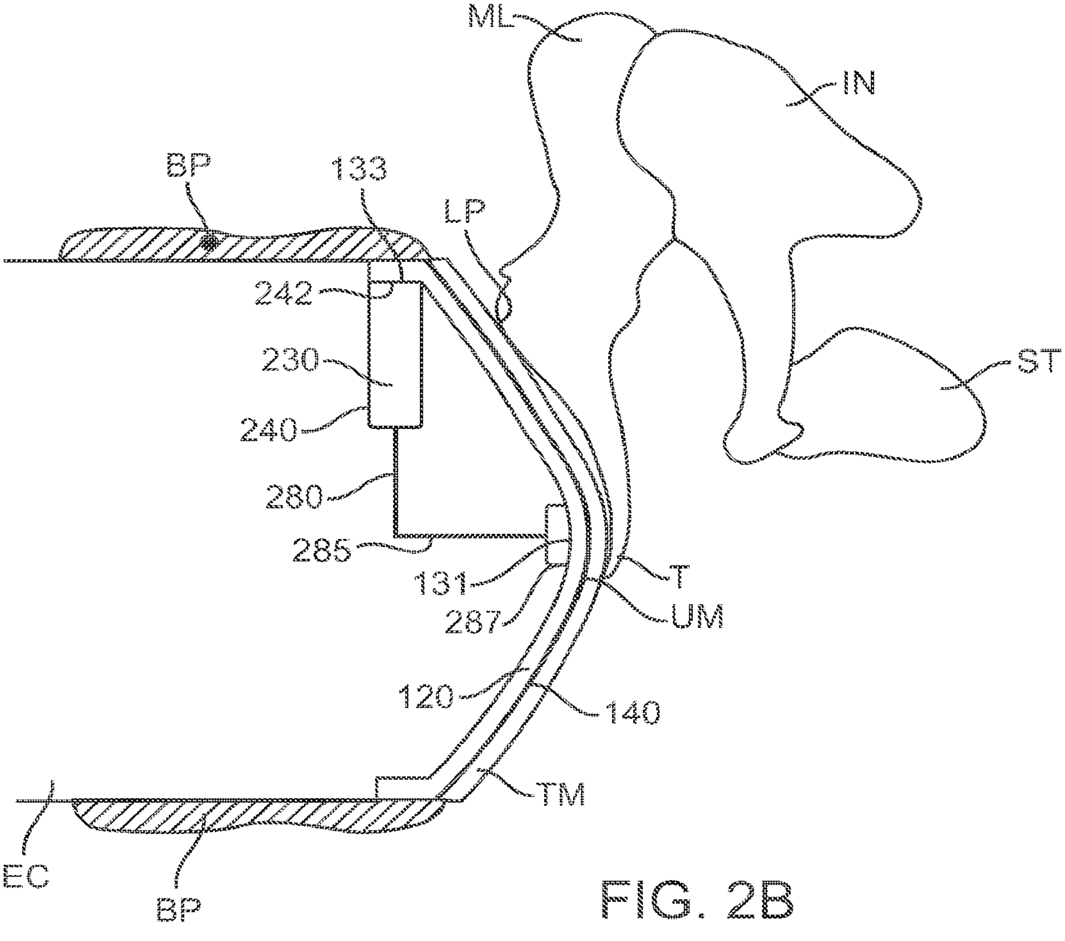

FIGS. 2A and 2B show the transducer 130 comprising balanced armature transducer 230 coupled to the support 120. The embodiments of FIG. 2A show the balanced armature transducer positioned on the support such the transducer is supported on the eardrum TM at a location away from the umbo, and the embodiments of FIG. 2B show the balanced armature transducer positioned on the support such that the transducer is supported by the bony part BP of the ear canal with skin SK disposed between the support and the bony part BP.

As shown in FIG. 2A, a portion 242 of the casing 240 may coupled to the support 120 at the second location 133 which corresponds to the lateral process LP of the malleus ML.

When coupled to the support 120 on the eardrum TM with the reed post 285 corresponding to the first location 131 and the portion 242 of the casing 240 corresponding to the second location 133, the transducer 130 may drive the eardrum by causing movement of reed post 285 in opposite directions 290. Such movement may cause a movement of portion 242 of casing 240 in directions 292, which will typically be in directions opposite of directions 290. Movement of portion 242 can be less than the movement of the reed post 285. For example, movement of portion 242 may be no more than about 75% of the movement of the reed post 285 when the transducer 130 drives the eardrum.

As shown in FIG. 2B, the second location 133 may be positioned on the support 120 so as to correspond bony tissue of the bony part BP of the ear canal EC with the skin SK disposed between bony part BP and the support. The support 120 can be sized to as to extend from the umbo to at least the bony part BP of the ear canal when the support is placed on the eardrum. The support may be shaped to fit the bony part BP of the ear canal. Placement of the second location 133 on the support so as to correspond to the bony part BP can reduce perceived occlusion. The tissue near the ear canal may also comprise cartilaginous tissue CT disposed under skin SK of the ear canal. Work in relation to embodiments of the present invention suggest that placement of the transducer on the support so as to correspond with bony part BP can provide support for the transducer.

Figure 3:
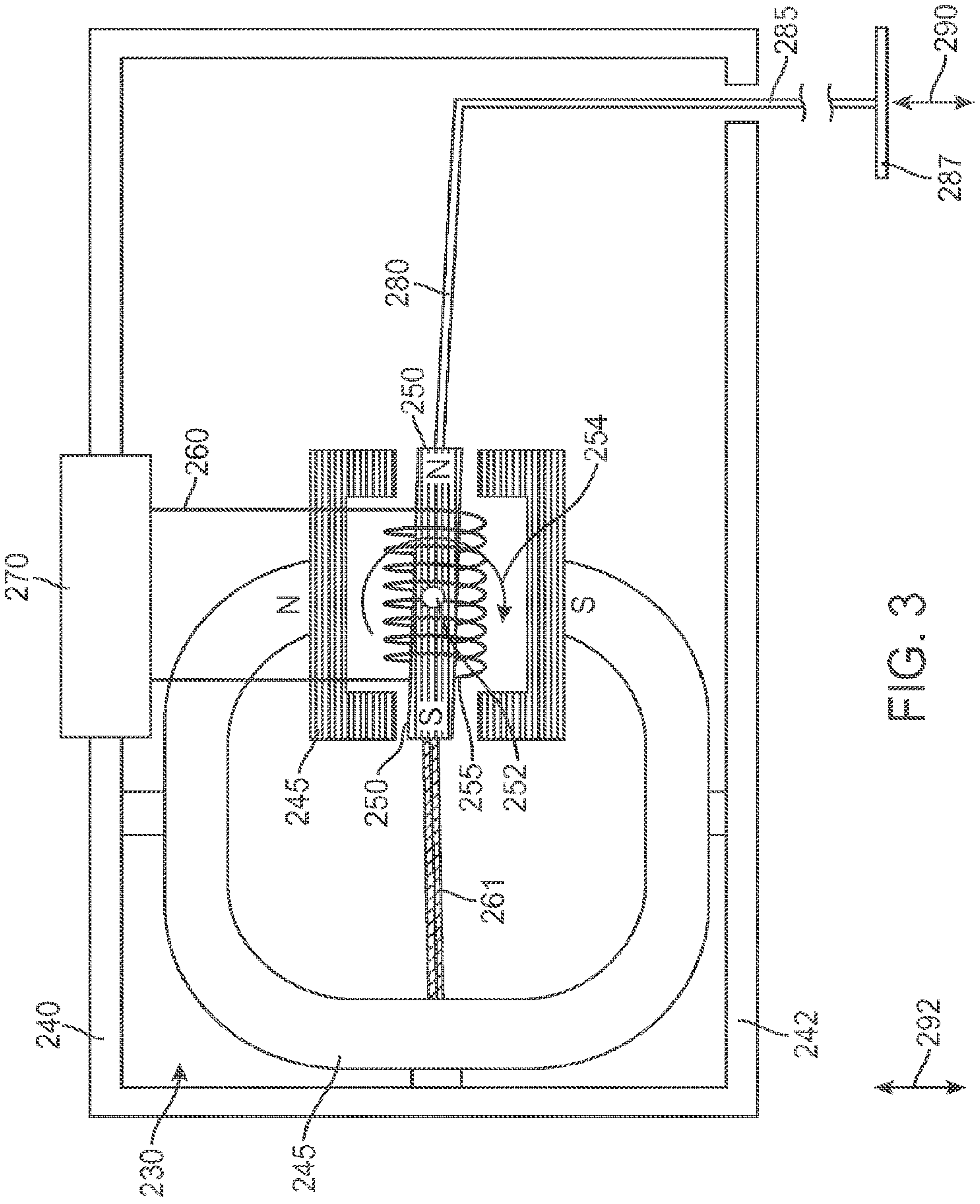
FIG. 3 shows a cross-sectional view of a balanced armature transducer of an output transducer according to embodiments of the present invention.
Figure 4:
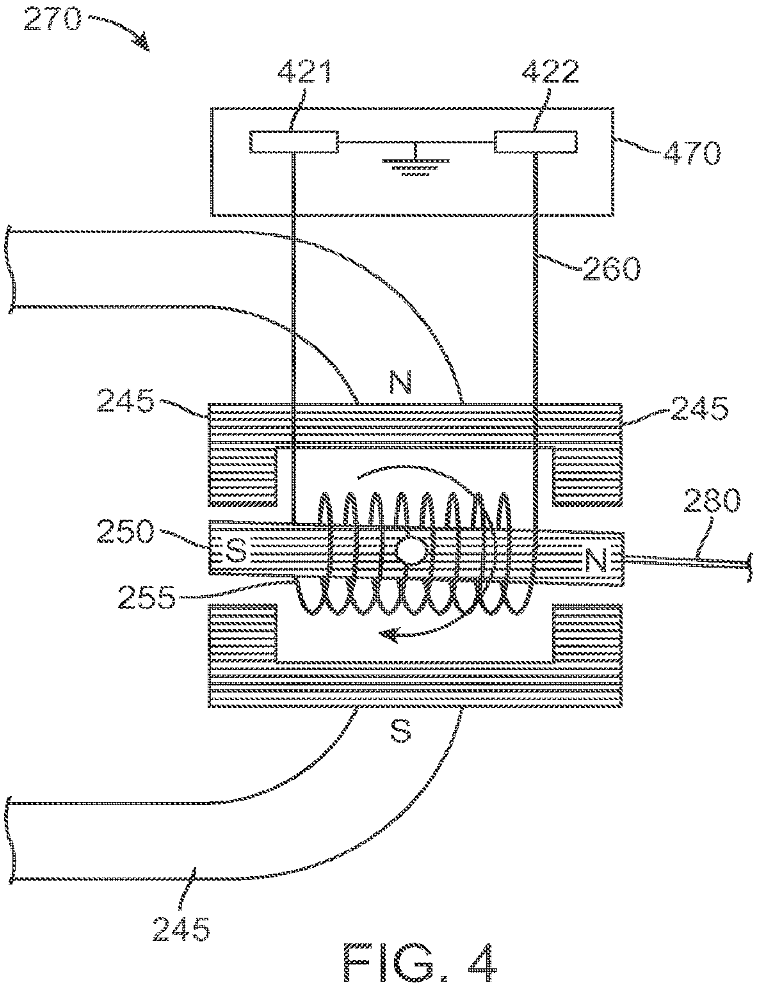

FIGS. 2C1 to 2C4 show views of the balanced armature transducer as in FIGS. 2 and 2A. FIG. 2C1 shows an isometric view of system 100 comprising balanced armature transducer 230. FIG. 2C2 shows a top view of the balanced armature transducer shown in FIG. 2C1. FIG. 2C3 shows a side cross sectional view of the balanced armature transducer placed on the eardrum TM, in which the side cross sectional view is along section A-A of FIG. 2C2. FIG. 2C4 shows a cross section of the isometric view of FIG. 2C1. Balanced armature transducer 230 comprises armature 250. Armature 250 comprises reed 280. Reed 280 may comprise a vibrator consisting of a thin strip of stiff material that vibrates to produce a sound, for example a tone. Reed 280 is coupled to support 120 with support post 285. Coil 255 can be positioned around armature 250 to drive the armature in response to current through the coil. A return yoke 282 may extend around magnet 245 so as to define a chamber 286. Chamber 286 defined by return yoke 282 may comprise a ferrofluid 284 disposed between poles of the magnet to improve energy transmission and efficiency from the balanced armature transducer to the support on the eardrum. Ferrofluid 284 may comprise suspended magnetic particles in a liquid which becomes strongly polarized in the presence of a magnetic field. The ferrofluid may comprise a colloidal mixtures composed of at least one of nanoscale ferromagnetic particles or ferromagnetic particles suspended in a carrier fluid, such as an organic solvent or water.

Figure 3A:
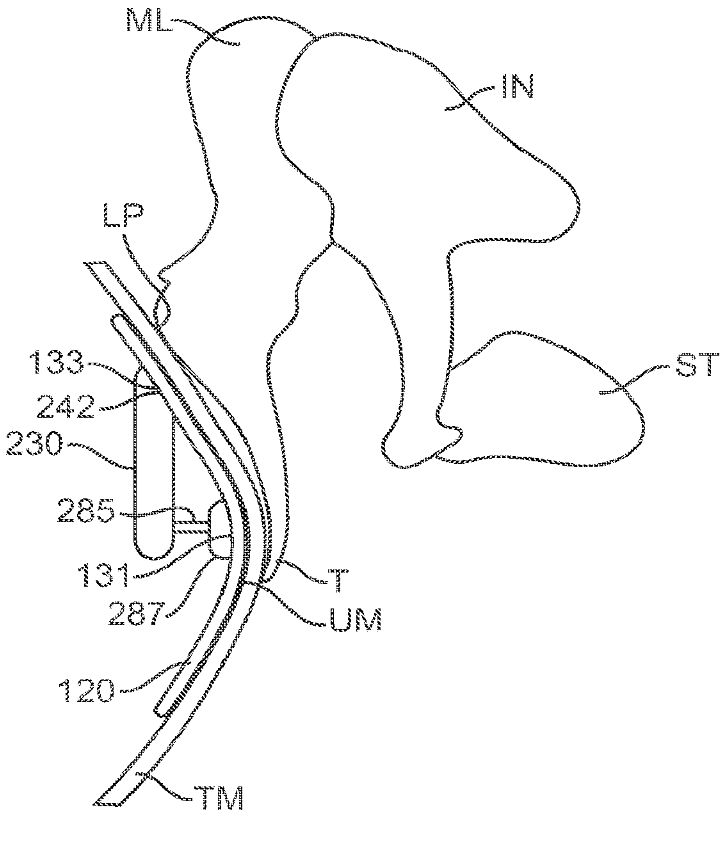
FIGS. 3A and 3B show side views of the output transducer of FIG. 3 coupled to the tympanic membrane.
Figure 3B:
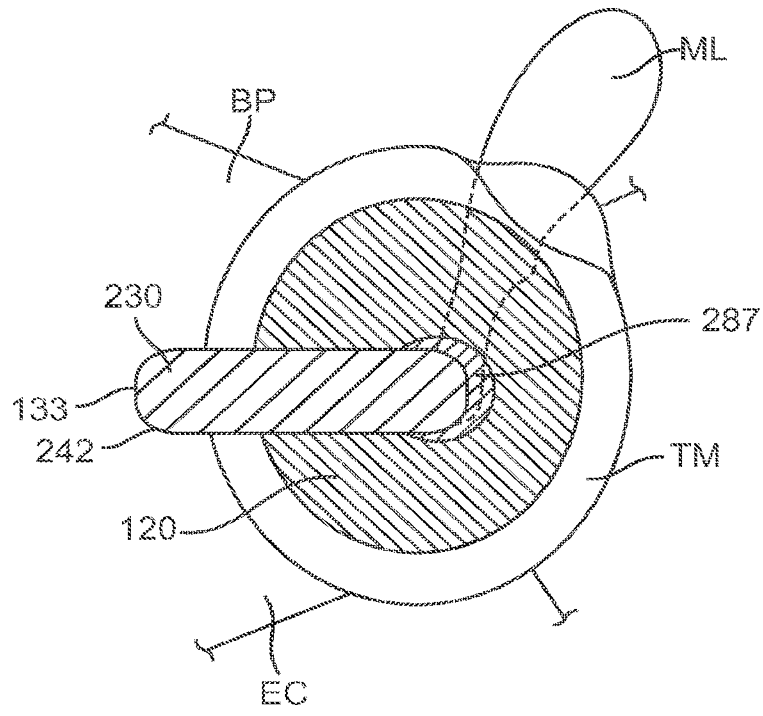

As shown by FIG. 3, the reed 280 may remain entirely within the casing 240. The reed post 285 may extend out of the casing 240. As shown in FIG. 3A, a portion 242 of the casing 240 may coupled to the support 120 at the second location 133 which corresponds to the lateral process LP of the malleus ML. Or, the second location 133 may correspond to bony tissue of the bony part BP of the ear canal EC as shown in FIG. 3B.

The transducer 130 may comprise other transducers such a coil responsive to the electromagnet, a magenetostrictve element, a photostrictive element, a piezoelectric element. These transducers may still be rigidly fixed within a casing and have at least one of a reed or post extending out. The combined mass of the transducer 130, support 120, post 185, casing 40, and input element 270 may comprise a combined mass. The components can be selected and arranged so as to minimize or decrease occlusion and provide comfort to the user. In some embodiments, the combined mass of transducer 130, support 120, post 185, casing 40, and input element 270 may comprise no more than about 120 mg, for example when the support is configured to extend to the bony part BP to support the transducer. The effective combined mass of 120 mg with such embodiments can correspond to a mass of no more than about 60 mg, or less, centered on the umbo. The combined mass of transducer 130, support 120, post 185, casing 40, and input element 270 may comprise no more than about 70 mg, for example when the transducer is positioned on the support such that the second location corresponds to the lateral process LP, such that the combined mass corresponds to a mass of no more than about 35 mg, or less, centered on the umbo. The combined mass of transducer 130, support 120, post 185, casing 40, and input element 270 may comprise no more than about 80 mg, for example when the transducer is positioned on the support such that the second location corresponds to the lateral process LP, such that the combined mass corresponds to a mass of no more than about 40 mg, or less, centered on the umbo. For example, the combined mass may comprise about 40 mg and correspond to about 20 mg centered on the umbo.

Referring now to FIG. 4, in some embodiments, transducer 130 may be optically coupled with input unit and/or element 270, which may comprise a photovoltaic transducer 470. The photovoltaic transducer 470 may comprise a first photodetector 421 and a second photodetector 422. The first photodetector 421 and the second photodetector 422 can be coupled to the coil 255 through the wires 260. The first photodetector 421 and the second photodetector 422 may drive a current through the coil 255 based on the optical signals they receive. Such optical signals may be from an optical source, for example, a laser diode or LED, of a completely in the canal unit or a behind the ear unit as described above. The first photodetector 421 may receive a power component of the optical signals while the second photodetector 422 may receive an audio signal component of the optical signals or vice versa. Alternatively or in combination, both the first photodetector 421 and the second photodetector 422 may receive unique components of the optical signal, each of which provide power and an audio signal to the receiver. The first photodetector 421 and the second photodetector 422 may comprise at least one photovoltaic material such as crystalline silicon, amorphous silicon, micromorphous silicon, black silicon, cadmium telluride, copper indium gallium selenide, and the like. In some embodiments, at least one of photodetector 421 or photodetector 422 may comprise black silicon, for example as described in U.S. Pat. Nos. 7,354,792 and 7,390,689 and available under from SiOnyx, Inc. of Beverly, Massachusetts. The black silicon may comprise shallow junction photonics manufactured with semiconductor process that exploits atomic level alterations that occur in materials irradiated by high intensity lasers, such as a femto-second laser that exposes the target semiconductor to high intensity pulses as short as one billionth of a millionth of a second. Crystalline materials subject to these intense localized energy events may under go a transformative change, such that the atomic structure becomes instantaneously disordered and new compounds are "locked in" as the substrate re-crystallizes. When applied to silicon, the result can be a highly doped, optically opaque, shallow junction interface that is many times more sensitive to light than conventional semiconductor materials. Photovoltaic transducers for hearing devices are also described in detail in U.S. Patent Applications Nos. 61/073,271, entitled "Optical Electro-Mechanical Hearing Devices With Combined Power and Signal Architectures"; and 61/073,281, entitled "Optical Electro-Mechanical Hearing Devices with Separate Power and Signal", the entire contents of which have been previously incorporated herein by reference and may be suitable for combination in accordance with some embodiments as described herein.

Referring now to FIGS. 4A and 4A1, in some embodiments, transducer assembly 100 comprising transducer 130 may be electromagnetically coupled to input unit and/or element 270 with a first coil 480 from the output transducer assembly. Input unit and/or element 270 of transducer assembly 100 may comprise a second coil 482. First coil 480 and second coil 482 are inductively coupled together. Through wires 260, second coil 482 is coupled to coil 255 of transducer 130 to drive a current therethrough.

Figure 4B:
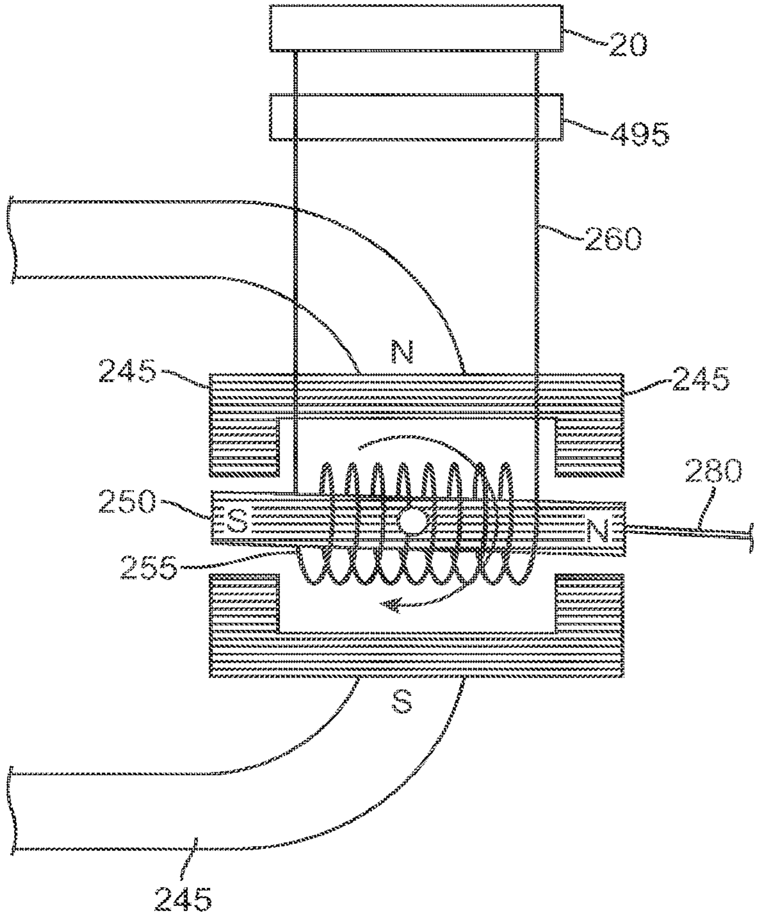
FIG. 4B shows an input transducer connected to a balanced armature transducer with a connector, according to embodiments of the present invention.

Referring now to FIG. 4B, in some embodiments, transducer assembly 100 comprising transducer 130 may be electrically coupled to input transducer assembly, for example BTE until 20, through a connector 495 and wires 260.

Figure 5A:
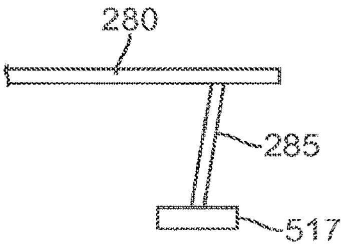
FIGS. 5A, 5B, and 5C show side views of armature post end portions according to embodiments of the present invention.
Figure 5B:
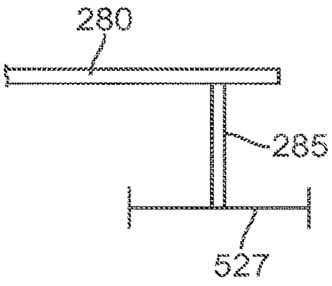
Figure 5C:
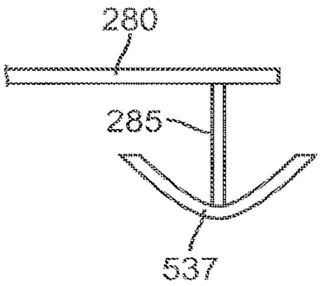

FIGS. 5A-5C1 show structures, for example anchors, attached to end portions of reed post 285 of transducer 130 according to embodiments of the invention. The attachment structures attached to end portions of reed post 285 couple the transducer 130 to the support 120 at the first location 131. As shown in FIGS. 5A and 5A1, an attachment structure 517 may comprise a flat plate. As shown in FIGS. 5B and 5B1, an attachment structure 527 may comprise a coil. As shown in FIGS. 5C and 5C1, an attachment structure exemplary end portion 537 may comprise a cone. Generally, these attachment structures attached to end portions of reed post 285 will be shaped to conform with the support 120 at the first location 131 and will comprise a diameter of less than 3 mm. Similar attachment structures may also be provided to couple the portion 242 of the casing 240 at the second location 133.

Figure 5D:
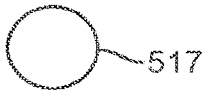
FIG. 5D shows a mass on the armature opposite the reed/post to counter balance the mass of the support and structures extending from the armature to the support.
Figure 5D:
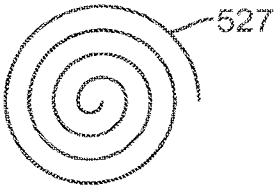
Figure 5D:
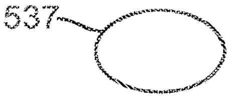
Figure 5D:
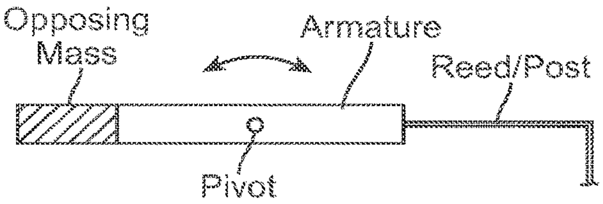

FIG. 5D shows an opposing mass on the armature located opposite the reed/post to counter balance the mass of the support and structures extending from the armature to the support. This additional mass can balance the armature symmetrically about the pivot to optimize energy transfer to the support. The armature may also be balanced by changing a location of the pivot to balance the armature with the load of the support placed on the eardrum.

Figure 6A:
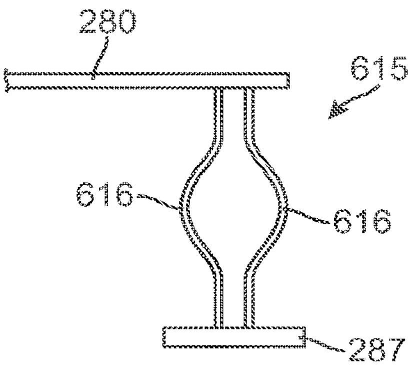
FIGS. 6A, 6B, and 6C show armature reed posts according to embodiments of the present invention.
Figure 6B:
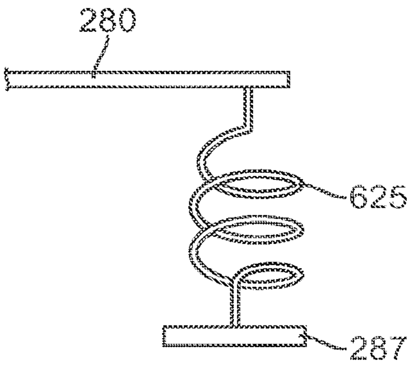
Figure 6C:
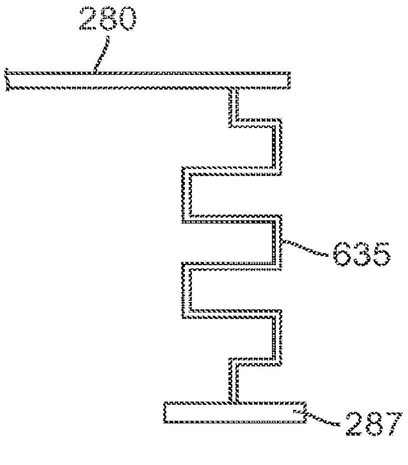

FIGS. 6A-6C illustrate posts of a transducer 130. These posts may comprise tuning structures to tune a gain of the transducer 130 in response to frequencies. For example, these tuning structures may resonate in response to vibrations at specific hearing frequencies, which may result in a gain in output amplitude of the output transducer assembly 100 at those frequencies. As shown in FIG. 6, a post 615 may comprise one or more curved wire tuning structures 616, 616'. As shown in FIG. 6B, a post may comprise a coil spring tuning structure 625. As shown in FIG. 6C, a post may comprise a flat spring tuning structure 635.

Alternatively or in combination with the post and/or tuning structure, the support may comprise a conformable material to decrease or inhibit pre-loading of the transducer against the eardrum. For example a conformable sponge material such as a viscoelastic memory foam can be coupled to the support and post and/or tuning structure so as to decrease or inhibit static pre-loading of the transducer against the eardrum. Alternatively or in combination, the conformable sponge material may comprise a medical grade silicone foam. The conformable sponge material may absorb static preloading of the transducer post without changing substantially the dynamic frequency response characteristics in the audible hearing range, for example with no more than about a 3 dB change in the dynamic frequency response. The conformable structure to decrease or inhibit low frequency loading, for example static loading, may increase user comfort, for example when the support engages the eardrum and the conformable structure changes shape from a first unloaded configuration to a second statically loaded configuration so as to decrease or inhibit pressure on the eardrum. For example, the end portion 287 of the reed post 285 may comprise the conformable sponge material to couple to the support 120 at the first location 131. The support 120 may also comprise the conformable sponge material, for example.

Figure 7:
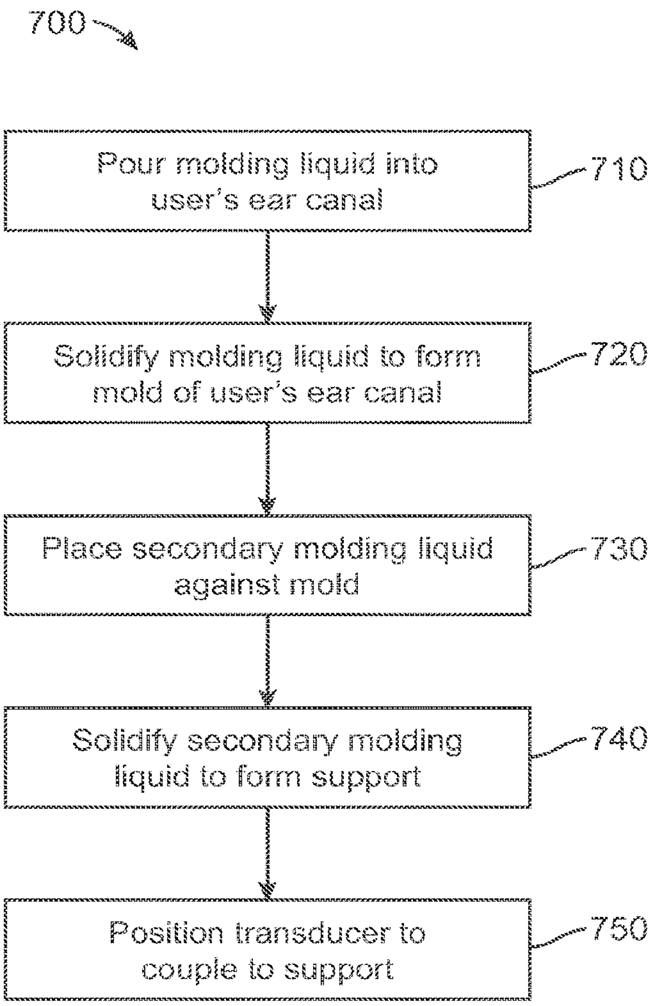
FIG. 7 is a diagram of a method of manufacturing a support of an audio system according to embodiments of the present invention.

As shown in FIG. 7, embodiments of the present invention may also provide a method 700 of manufacturing a device to transmit an audio signal to a user, for example, the output transducer assembly 100. A step 710 pours a molding liquid into the user's ear canal. A step 720 solidifies the molding liquid to form a mold of the user's ear canal. A step 730 places molding liquid against the formed mold. A step 740 solidifies the molding liquid to from the support 120. A step 750 positions the transducer 130 to couple to the support 120, for example, to a first location and a second location separated from the first location by at least about 1 mm. The transducer 120 may be affixed to the support with a first attachment structure at the first location 131 and a second attachment structure at the second location 133 as described above. The molding liquid may comprise at least one of a silicone, a hydrogel, or collagen.

Figure 8A:
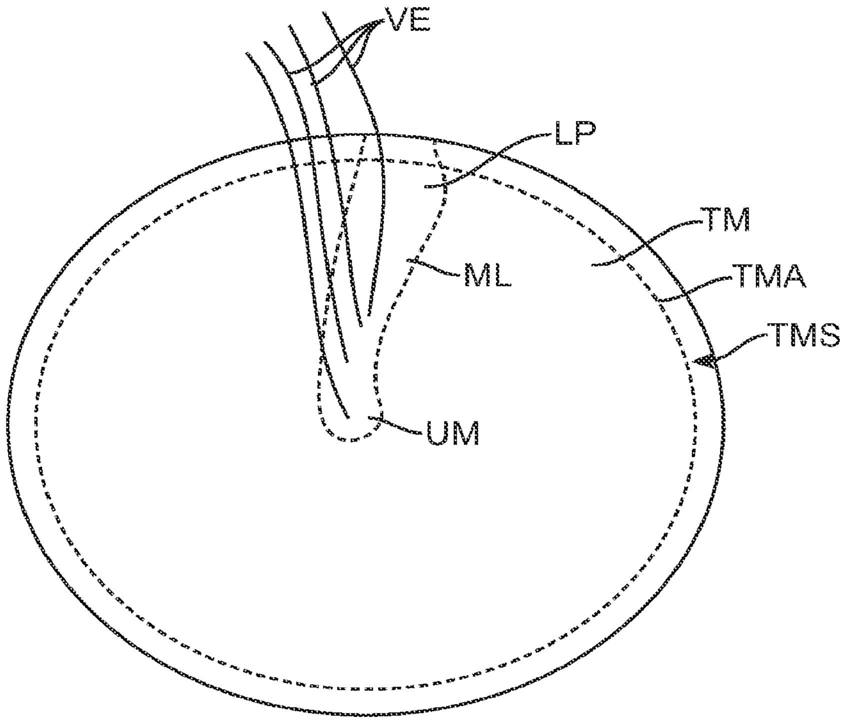
FIG. 8A shows blood vessels extending into the eardrum along the malleus that can be used to determine a shape of a recess in the support, according to embodiments of the present invention.

FIG. 8A shows blood vessels VE extending into the eardrum TM along the malleus ML that can be used to determine a shape of a recess in the support. The eardrum TM comprises an annulus TMA. The annulus TMA comprises an outer portion of the eardrum TM. The annulus TMA is anatomically disposed over a tympanic membrane sulcus TMS. The sulcus TMS may occur naturally in the bone of the user and can be affixed to the annulus TMA of the eardrum TM. The annulus TMA can be somewhat non-circular and may extend circumferentially around at least a portion of an outer boundary of the eardrum TM. The annulus TMA may be less well defined near the malleus ML. The support can be configured for placement at least partially over the annulus TMA of the eardrum TM, so as to decrease or inhibit occlusion. The support may be configured with a recess to decrease contact with the tissue comprising the blood vessels that extend along the malleus. The recess can at least extend inwardly, for example with a concavity, near the edge of the eardrum TM. The support can be configured based on a mold of the user's ear, as described above.

Figure 8B:
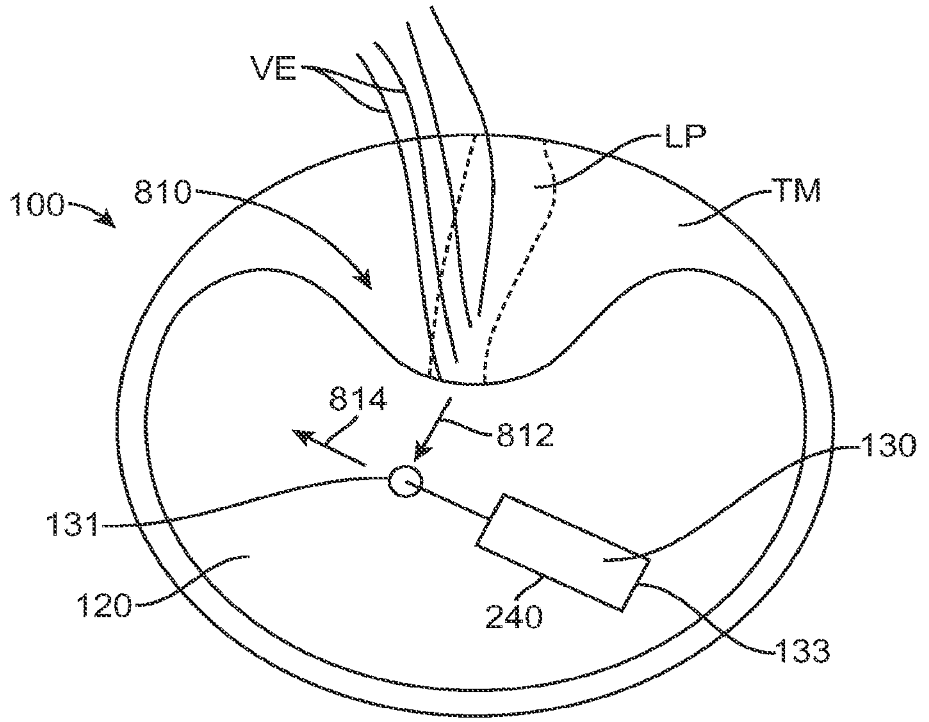
FIG. 8B shows a support comprising a short dimension and an elongate dimension so as to define a recess, according to embodiments of the present invention.

FIG. 8B shows a support comprising a short dimension 812 and an elongate dimension 814 so as to define a recess 810. The transducer 130 can be coupled to the support at a first location 131 and a second location 133. Transducer 130 may comprise the balanced armature transducer 230 having a housing 240 as described above. The second location 133 can be disposed on an outer location of the support 120 so as to couple to the eardrum TM at an outer location so as to decrease or inhibit occlusion. For example the second location 133 can be positioned so as to correspond to one or more of an outer portion of the tympanic membrane TM inside the annulus TMA, an outer portion of the tympanic membrane TM comprising the annulus TMA, or to a portion of the skin disposed over the bony process BP, as described above. First location 131 can be positioned on the support at an inner location so as to couple to the eardrum near the umbo. The first location 131 may be positioned on the support so as to couple to the eardrum over the umbo, as described above. Alternatively or in combination, the first location may be positioned on the support at an inner location so as to couple to the eardrum at an inner location disposed at least partially away from the blood vessels extending to the umbo, for example about 1 mm away from the blood vessels extending to the umbo.

The input element 270, as described above, can be rigidly coupled to housing 240 of the assembly 100, such that the input is supported with the housing 240. Alternatively or in combination, the input element may be affixed to the support.

FIG. 8C shows support 120 comprising a concave surface so as to define recess 810 with a channel 810C. Support 120 can be configured from a mold of the user's ear as described above, and channel 810C can be formed so as to receive the tissue of the eardrum TM comprising vessels VE extending at least partially along the manubrium. For example, the material can be placed on a mold of the user's eardrum and additional material positioned on the mold to define the channel, and the support can then be made from the mold and additional material so as to make the support 120 having the channel 810C.

FIG. 8D shows a support 120 having a recess 810 and at least one of structure 820 to couple the transducer to the eardrum. The at least one structure 820 comprises a first end 822 and a second end 824. First end 822 can be affixed to transducer 130 and second end 824 can be affixed to the support such that the at least one structure urges the transducer 130 toward the eardrum TM to couple the transducer to the eardrum. Transducer 130 may comprise the balanced armature transducer 230 having a housing 240 as described above.

The support 120 can be configured in many ways to couple the transducer 130 to the eardrum. The support 120 may be configured with single molded component comprising an inner portion and an outer portion, each configured to contact the eardrum, as described above. Alternatively, support 120 may comprise two or more components, each configured contact the eardrum. Support 120 may comprise an outer component 830 and an inner component 840. Outer component 830 may comprise recess 810 and may be sized to the ear of the user. For example, outer component 830 may comprise O-ring sized to the eardrum TM of the user. In some embodiments, the sized O-ring can be cut to form recess 810 such that the O-ring comprises a C-ring. The transducer 130 can be affixed to the outer component 830 at second location 133 such that second location 133 corresponds to a portion of the annulus TMA of the eardrum TM. Inner component 840 may be size to fit within the outer component 830. For example outer component 830 may comprise an opening 832 having a dimension across, and inner component 840 may comprise a dimension across that is smaller than the dimension of the opening such that the inner component 840 fits inside the opening. Transducer 130 can be coupled to the inner component 840 comprising first location 131 with structures such as a reed 280 coupled to a post 285 of a balanced armature transducer, as described above. The post 285 may extend through the opening 832 to couple transducer 130 to inner component 840 of support 120. The post and reed may comprise many structures, for example rigid structures. Alternatively or in combination, post 285 may comprise a filament having a cross-section sized to move the eardrum TM in response to movement of reed 280.

The input element 270, as described above, can be rigidly coupled to housing 240 of the assembly 100, such that the input is supported with the housing 240. Alternatively or in combination, the input element may be affixed to the support.

FIG. 8D1 shows the support of FIG. 8D with the at least one structure 820 in an unloaded configuration prior to placement against the eardrum. The inner component 840 of support 120 extends a first distance L1 from outer component 830 of support 120. The outer component 830 may comprise a stop configured for placement against at least one of the outer portion of the eardrum of the distal portion of skin SK disposed over the bony portion BP of the ear canal EC, such that the coupling of the inner component 840 to the eardrum TM occurs in a desired, for example predetermined, configuration.

FIG. 8D2 shows the support of FIG. 8D with the at least one structure in a loaded configuration when the support is positioned against the eardrum. The inner component 840 of support 120 extends a second distance L2 from outer component 830 of support 120, such that second component 840 exerts a force F against eardrum TM. The post 285 may comprise a conformable foam structure so as to decrease or inhibit low frequency loading, for example static loading, when the support is coupled to the eardrum, as noted above. Alternatively or in combination, the inner component 840 may the conformable foam material so as to decrease or inhibit low frequency loading, for example static loading, as described above.

The at least one structure 820 may comprise many structures configured to couple the transducer to the eardrum. For example, the at least one structure 820 may comprise a spring or an elastic material or a combination thereof. For example the spring may comprise a leaf spring or a coil spring. The at least one structure 820 may comprise an elastic material, such as silicone elastomer configured to stretch and pull the transducer toward the eardrum when the support is positioned on the eardrum. The at least one structure may comprise parallel struts configured to extend across the support to opposing sides of the support. The transducer 130 may pivot about second location 133 to couple to the eardrum. Alternatively or in combination, post 285 may comprise the at least one structure 820, as shown in FIG. 8D3. The at least one structure 820 may comprise one or more of the tuning structures, as described above.

The above structures of support 120 can be configured in many ways to couple effectively the transducer 130 to the ear of the user. The mass of the balanced armature transducer may comprise a center of mass that can be positioned away from the umbo as described above. The force exerted by the at least one structure 820 can be determined based on empirical studies so as to inhibit occlusion and substantially couple the transducer to the eardrum. For example, the mass of the transducer and force of the at least one structure can be determined so as to match substantially the impedance of the transducer coupled to the eardrum to the impedance of the eardrum, such that energy transmission can be efficient. The force of the at least one structure can be configured so as to couple the transducer to the eardrum, for example without fluid disposed between the support and the eardrum at the inner location of the support, although fluid may be used.

FIG. 8E1 shows a medial view assembly 100 comprising support 120 having an outer portion 830 comprising an O-ring 830R and a flange 850 extending from the O-ring. The outer portion 830 is configured for placement at least partially over an outer portion of the eardrum comprising the annulus TMA. The support 120 comprises inner portion 840 configured for placement over an inner portion of the eardrum to drive the eardrum with the inner portion. The O-ring 830R can be sized to the ear of the user, for example selected from a plurality of sizes of O-rings and fit to a mold of the user. The flange may comprise many materials suitable for support 120 as described above, and may be coupled to the ear with a fluid comprising a liquid as described above. For example, the flange material comprising a liquid such as silicone may be deposited on the mold to correspond to outer portion 830, and the O-ring positioned on the liquid material and cured thereon. The transducer can be affixed to one or more of the O-ring and flange at second location 133, such that inner portion 840 corresponds to a desired location of the inner portion of the eardrum based on the mold. The second location 133 may correspond to a portion of the annulus away from the malleus ML and the vessels VE of the eardrum TM extending along the malleus. The support material can be deposited on the mold to correspond to inner portion 840 and cured with the post 285 extending thereto. Work in relation to embodiments suggests that positioning the second end 133 away from the malleus may be sufficient to decrease or inhibit substantially user perceptible noise related through blood vessels VE, and it is contemplated that in at least some embodiments the support may not comprise the recess. The outer portion may optionally be formed with recess 810 with material positioned on the mold to form the recess 810 as a concavity extending laterally away from the umbo. Alternatively or in combination, the outer portion 830 comprising O-ring 830R can be cut at a location corresponding to the malleus and vessels VE so as to form a C-ring. Based on the teachings described herein, a person of ordinary skill in the art can conduct empirical studies on patients to determine the position of second location 133 and whether a recess is helpful and the location of the recess when present.

The input element 270, as described above, can be rigidly coupled to housing 240 of the assembly 100, such that the input is supported with the housing 240. Alternatively or in combination, the input element may be affixed to the support.

FIG. 8E2 shows a side view of the assembly as in FIG. 8E1. The transducer 830 can be coupled to the outer portion 830 and sized such that inner portion 840 corresponds to an intended inner portion of the eardrum. For example, inner portion 830 may correspond to the umbo. Alternatively, inner portion 830 may correspond to an inner portion of the eardrum TM separated from the umbo. Based on the teachings described herein, a person of ordinary skill in the art can determines suitable configurations of inner portion 840 to couple to the inner portion of the eardrum so as to couple to eardrum TM with decreased interference from blood vessels extending along the malleus ML.

The assemblies and supports shown in FIGS. 8B to 8E can be configured so as to support with an outer portion at least one photodetector, or at least one coil, so as to receive electromagnetic energy as described above.

Figure 9A:
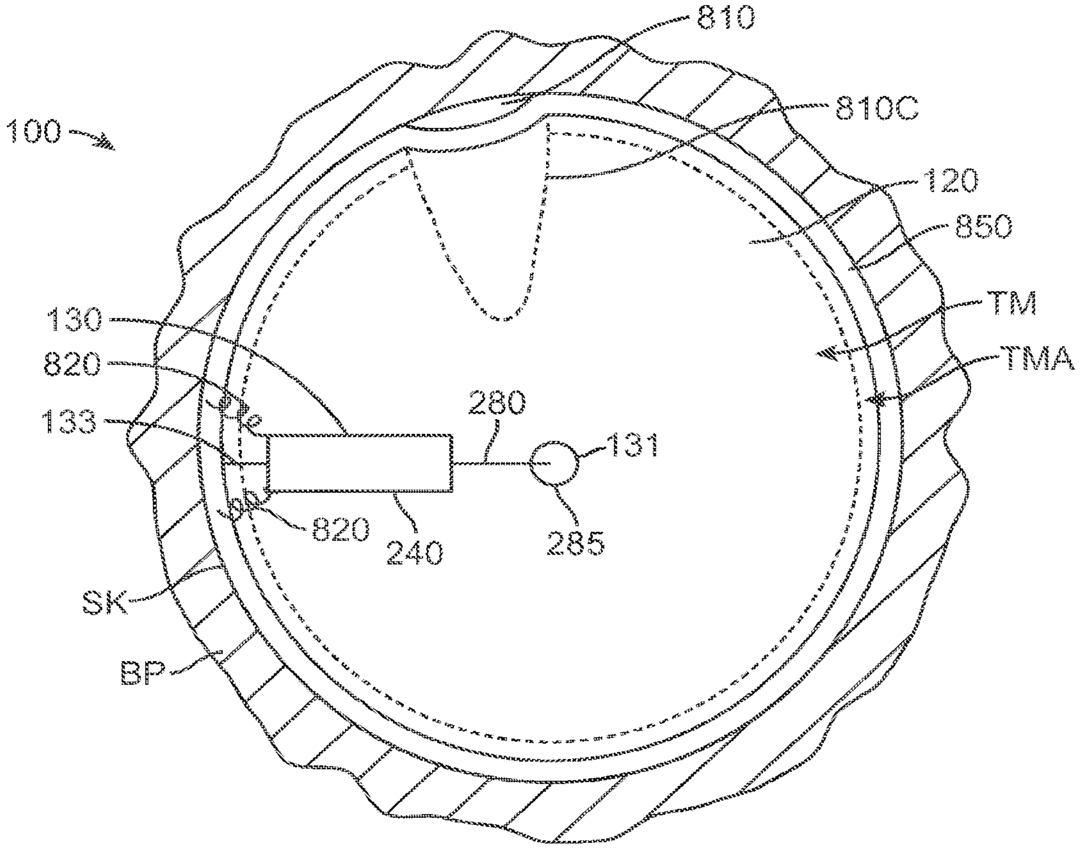
FIG. 9A shows a support extending to the skin disposed at least partially over the bony process and comprising a structure, for example a flange, extending at least partially along the ear canal, according to embodiments of the present invention.

FIG. 9A shows support 120 extending to the skin SK disposed at least partially over the bony process BP. Support 120 may comprise a flange 850, for example a rim, extending at least partially around the support. Flange 850 may be sized to the user, for example based on a mold and/or molded from a mold of the user. The support may comprise a recess 810 and a channel 810C as described above. Recess 810 and channel 810C may extend into the support 120 near the vessels VE as described above. Flange 850 may be located on the support 120 so as to correspond to the annulus TMA of the eardrum TM. Flange 850 may comprise recess 810 and channel 810C. Transducer 130 can be coupled to the eardrum TM with at least one structure 820 as described above. Alternatively or in combination at least one structure 820 may comprise a compression structure. For example, transducer 130 can be configured to pivot about second end 133, for example with compression structure, for example a compression spring, coupled to flange 850 so as to urge transducer 130 toward the eardrum TM to couple the transducer to the eardrum. Transducer 130 may comprise the balanced armature transducer 230 having a housing 240 as described above.

The input element 270, as described above, can be rigidly coupled to housing 240 of the assembly 100, such that the input is supported with the housing 240. Alternatively or in combination, the input element may be affixed to the support.

FIG. 9B shows a support comprising at least one rigid support structure 826 configured to extend substantially across the eardrum, for example to locations on the support corresponding to skin disposed on substantially opposite sides of the ear canal. The at least one rigid support structure 826 may comprise, for example, a pair of steel rods, with the at least one rigid structure configured to extends substantially across the eardrum and separated from the eardrum when the support is positioned on the ear, so as to decrease occlusion as the weight of the support is disposed near the outer portion of the eardrum, for example with skin disposed over the bony portion EP. The electromagnetic transducer, for example photodetector 470 as described above, can be supported with an outer portion of the support, such that the mass of the photo detector is supported with the skin disposed at least partially over the bony process BP. Alternatively or in combination, the photodetector 470 can be supported with the at least one rigid structure.

The at least one rigid structure 826 can be coupled to the transducer in many ways to couple the transducer to the eardrum. The at least one structure 820 may comprise the rigid support structure 826, such that the first end 822 is coupled to the transducer 130. The at least one of the resilient member or spring may be coupled to the at least one rigid structure to urge the transducer toward the eardrum, as described above.

Alternatively to or in combination with at least one rigid structure 826, transducer 130 can be driven toward the tympanic membrane TM with a transducer 828, for example a piezoelectric bender, when the assembly receives energy to drive the transducer 130.

FIG. 9B1 shows a side view of the support as in FIG. 9B in a first configuration 928A corresponding to a passive configuration when energy, for example light energy, is not transmitted to the assembly. The inner portion comprising first location 131 extends a first distance L1 from the at least one rigid structure 820, such that the inner portion comprising first location 131 can decouple from the eardrum.

FIG. 9B2 shows a side view of the support as in FIGS. 9B and 9B1 in a second configuration 928B configured to couple to the eardrum. The inner portion comprising first location 131 extends a second distance L2 from the at least one rigid structure 820, such that the inner portion comprising first location 131 can couple to the eardrum. The first distance L1 and the second distance L2 may correspond to distances from a stop as described above. For example, photodetector 470 can be driven with light energy, and transducer 828 can be configured to urge transducer 130 medially towards eardrum TM in response to the light energy. Transducer 828 can be coupled to the at least one rigid structure 826 and to transducer 130 to position transducer 130. For example, the transducer 828 may comprise a first passive configuration and a second active configuration. With the first configuration, transducer 828 positions the inner portion of the support 120 laterally away from eardrum TM to decrease occlusion, for example when no light signal is transmitted to the detector such that transducer 828 comprises the passive configuration. When transducer 828 comprises the second configuration, transducer 828 can position the inner portion of support 120 medially to couple to the eardrum, for example with contact, such that transducer 130 can drive the eardrum TM in response to the optical signal. Transducer 828 may consume small amounts of power as compared to transducer 130 as the second configuration may comprise a substantially fixed configuration such that transducer 130 can drive the eardrum TM. For example, transducer 828 may be coupled to photodetector 470 with rectification and low pass filtering, such that transducer 828 is driven with a small DC voltage when light is transmitted to photodetector 470 so as to couple transducer 130 to eardrum TM when the light energy is transmitted. Transducer 828 may comprise an elastic motor comprising and elastic component and an electrical component.

FIGS. 9C1 and 9C2 shows side and top views, respectively, of a support comprising at least one rigid structure 826 coupled to a transducer with pivoting coupling and at least one structure 820 to couple the transducer to the eardrum. The at least one structure 820 comprises a first end 822 and a second end 824. First end 822 can be affixed to transducer 130 and second end 824 can be affixed to the support such that the at least one structure urges the transducer 130 toward the eardrum TM to couple the transducer to the eardrum. Transducer 130 may comprise the balanced armature transducer 230 having a housing 240 as described above. The transducer 830 can move relative to the at least one rigid structure, for example with a pivot movement 133P, so as to couple the transducer to the umbo in response to urging of at least one structure 820.

FIG. 9D1 shows transducer reed coupled to a support with a viscous material disposed therebetween, so as to inhibit low frequency loading, for example static loading, of the transducer when the support is coupled to the eardrum. The reed 280 comprising a rigid material extends to the post 285, as noted above. The viscous material can be configured in many ways so as to couple the reed to the support 131. For example, the post 285 may comprise the viscous material, for example a viscoelastic material such as memory foam. Alternatively or in combination, the viscous material may comprise a viscous fluid, for example a viscous liquid 910 disposed within a container 920, and the post 285 may extend into the container so as to couple to the support 131 with the liquid. The viscous liquid 920 may comprise many liquids and can comprises a viscosity at least as much as the viscosity of water. For example, water comprises a dynamic viscosity of about 0.89 cP (centi-Poise), and the viscosity can be greater, for example at least about 10 cP, or at least about 100 cP. Suitable viscous liquids include castor oil with a viscosity of about 985 cP, ethylene glycol with a viscosity of about 16 cP, glycerol with a viscosity of about 1500 cP, olive oil with a viscosity of about 81 cP, and pitch with a viscosity of about $2.3\times10^{11}$ cP. The viscosity can be within a range from about 1 cP to about $2.3\times10^{11}$ cP. The viscosity of the liquid can be selected depending on design parameters such as one or more of the inside diameter of the container, the outside diameter of the post, the clearance between the inside diameter of the container and the outside diameter of the post.

FIG. 9D2 shows a transducer reed 280 coupled to the support with the viscous liquid 910 so as to inhibit low frequency loading, for example static loading, of the transducer and occlusion when the support is coupled to the eardrum. The post can be affixed to flange having openings 185H formed thereon so as to pass liquid 910 with flow 910F through the holes when the support 131 is coupled to the eardrum TM. The openings in the flange can be formed in many ways, for example with one or more of holes drilled in the flange, an annular opening formed in the flange, or an annular flange supported with spokes.

Figure 9E:
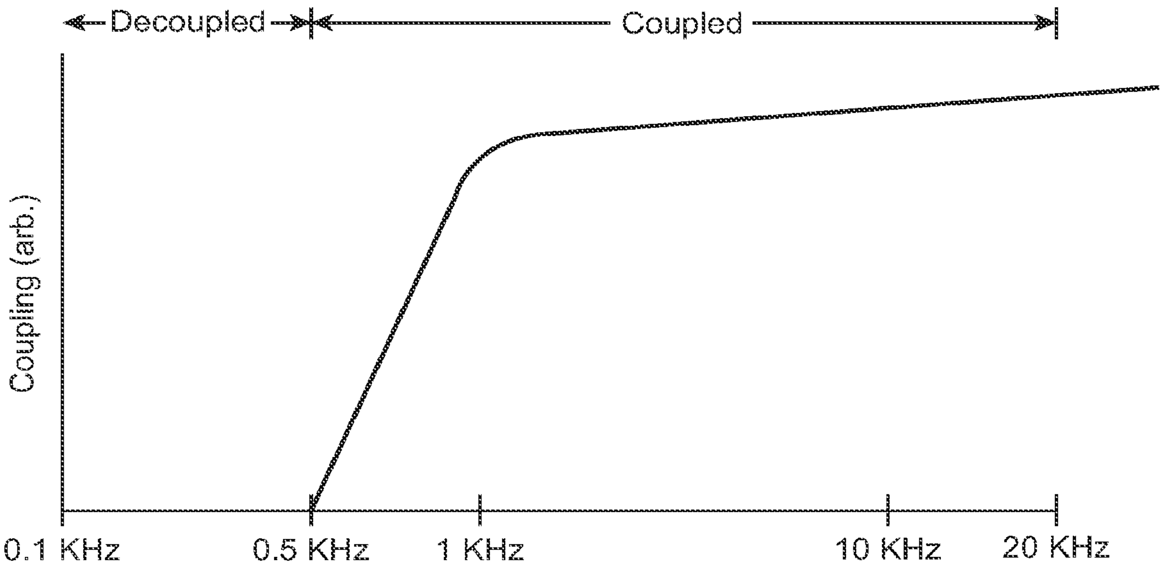
FIG. 9E shows coupling as a function of frequency so as to inhibit low frequency loading, for example static loading, of the transducer and occlusion when the support is coupled to the eardrum as in FIGS. 9D1 and 9D2.

FIG. 9E shows coupling as a function of frequency so as to inhibit low frequency loading, for example static loading, of the transducer and occlusion when the support is coupled to the eardrum as in FIGS. 9D1 and 9D2. Occlusion comprises low frequency inhibition of eardrum motion for example at frequencies below about 1 kHz, for example below about 500 Hz. By allowing motion of the eardrum and support to decouple from motion of the transducer, the eardrum can move so as to substantially decreased occlusion. Also, low frequency loading, for example static loading, of the transducer with the eardrum can be substantially decreased or inhibited, which can be helpful with many transducers such as balanced armature transducers. Also, decreased or inhibited low frequency loading, for example static loading, of the transducer on the ear drum can be helpful so as to decrease pressure against the eardrum should the support and transducer become dislodged and displaced medially. As many people with hearing loss hear well at frequencies below about 1 kHz, for example below about 500 Hz, this decoupling of the transducer to the support is acceptable as the user can rely on his or her natural hearing to hear a speaker. At frequencies above about 500 Hz, for example about 1 kHz, the reed of the transducer couples substantially to the support, such that the sound can be amplified with the transducer, which can be helpful for the many people with hearing loss who hear poorly at frequencies above about 1 kHz, for example above about 5 kHz. The decoupling of the transducer to the support may correspond gain of no more than about −13 dB, or 20% transmission, for example no more than −20 dB, or 10% transmission. The substantial coupling of the transducer may correspond to a gain of at least about −3 dB, or 70% transmission, for example −1 dB, or 90% transmission. A person or ordinary skill in the art can conduct studies to determine empirically parameters of the liquid, container size and post, to decrease or inhibit low frequency loading, for example static loading, of the transducer and inhibit occlusion when the support is coupled to the eardrum. Suitable parameters determined empirically include on or more of the viscosity of the liquid, the inside diameter of the container, the size of the post, the clearance of the flange with the container, or the size and number of holes in the flange.

Figure 10:
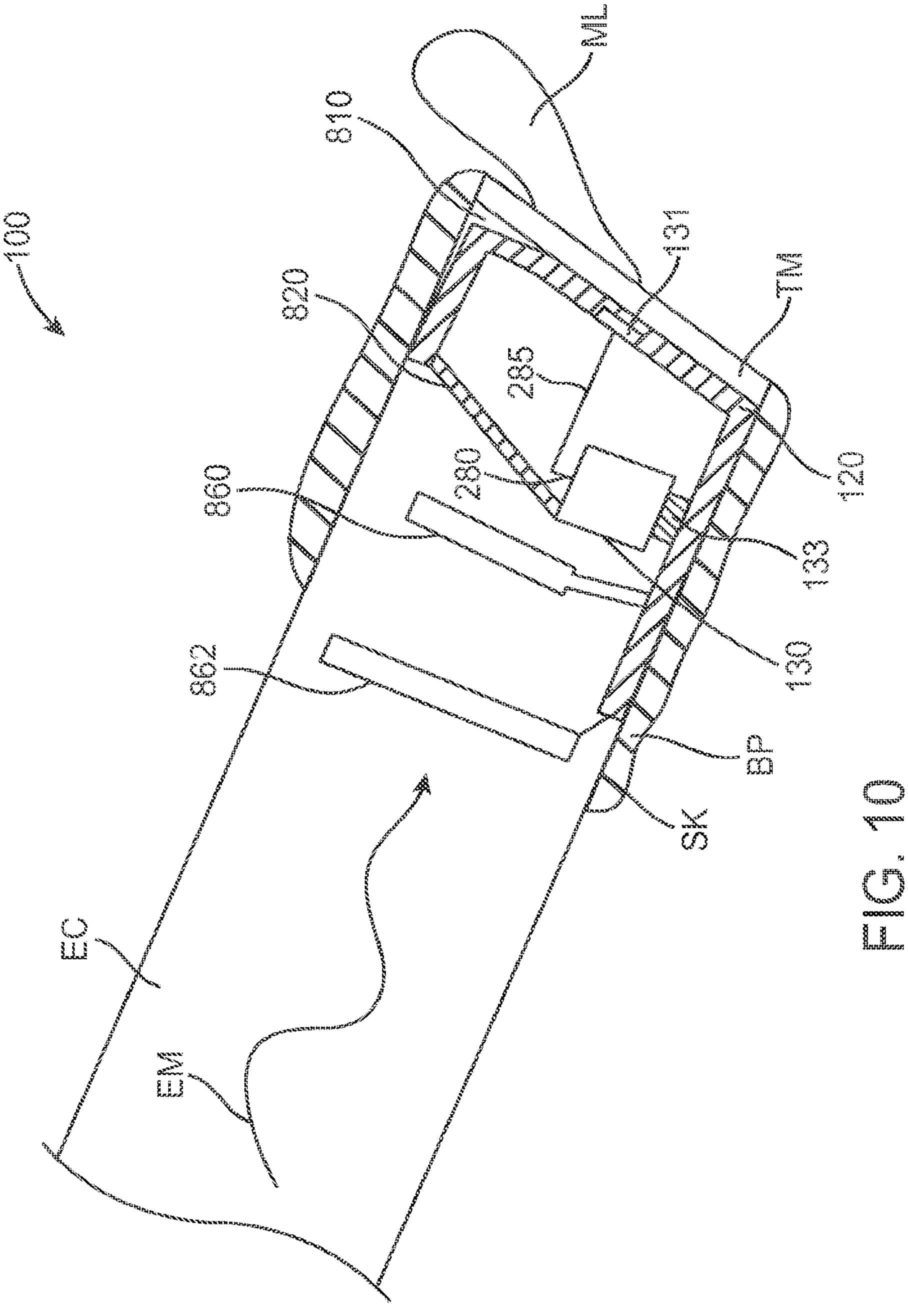
FIG. 10 shows a support comprising an electromagnetic transducer configured to receive electromagnetic energy to drive the transducer, according to embodiments of the present invention.

FIG. 10 shows a support comprising an electromagnetic transducer configured to receive electromagnetic energy to drive the transducer in response to electromagnetic energy EM. Transducer 860 may comprise a coil, as described above. For example, transducer 860 may comprise a first coil configured to receive electromagnetic energy from a second coil positioned in the ear canal EC, in which the second coil is held in place and user removable as described in U.S. patent application Ser. No. 12/244,266, entitled “Energy Delivery and Microphone Placement Methods for Improved Comfort in an Open Canal Hearing Aid". The transducer can be coupled to the support with the many structures and methods as described above, for example so as to couple the transducer to the eardrum and decrease occlusion and to inhibit low frequency loading, for example static loading, of the transducer and eardrum, as described above.

In many embodiments, transducer 860 comprises at least one photodetector, for example photodetector 470 as described above. Transducer 860 can be affixed to the support at a location corresponding to the skin SK disposed over the bony process BP, so as to minimize or decrease occlusion when the support is positioned over the bony process BP. The at least one photodetector may comprise one or more photodetectors as described in U.S. Pat. App. No. 61/177,047, filed May 11, 2009, entitled "Optical Electro-Mechanical Hearing Devices With Combined Power and Signal Architectures"; and U.S. Pat. App. No. 61/139,520, filed Dec. 19, 2008, entitled "Optical Electro-Mechanical Hearing Devices with Separate Power and Signal Components". These applications describe beneficial methods and apparatus for optically coupling light to a hearing assembly that can be incorporated in accordance with embodiments of the present invention. For example, the electromagnetic energy EM may comprise a first wavelength of light and a second wavelength of light, and the at least one photo detector may comprise two photo detectors in which a first photodetector is sensitive to a first wavelength of light and the second photodetector is sensitive to a second wavelength of light. Each photo detector can be coupled to the transducer with opposite polarity, such that the transducer is driven in a first direction in response to the first wavelength and a second direction in response to the second wavelength, in which the first direction may be opposite the second direction. Alternatively, the at least one photodetector may comprise a single photodetector, and the single photodetector configured to receive power and signal information from light. Active circuitry may be coupled to the at least one detector and transducer to drive the transducer, and the active circuitry may be supported with the skin SK disposed over the bony process BP.

An optical component 862 can be affixed to the support to couple light energy to the at least one photodetector. The optical component may comprise one or more of a lens, a refractive lens, a diffractive lens, a prism, a Fresnel lens, or a mirror. The optical component is positioned on the support 120 so as to at least one of refract, diffract or reflect the light signal onto the at least one photodetector. In many embodiments, the optical component positioned on the support in a predetermined orientation so as to efficiently couple light transmitted along the ear canal EC to the at least one photodetector. Alternatively or in combination, the optical component can be mounted adjustably, for example one or more of pivoting or bending.

Figure 11:
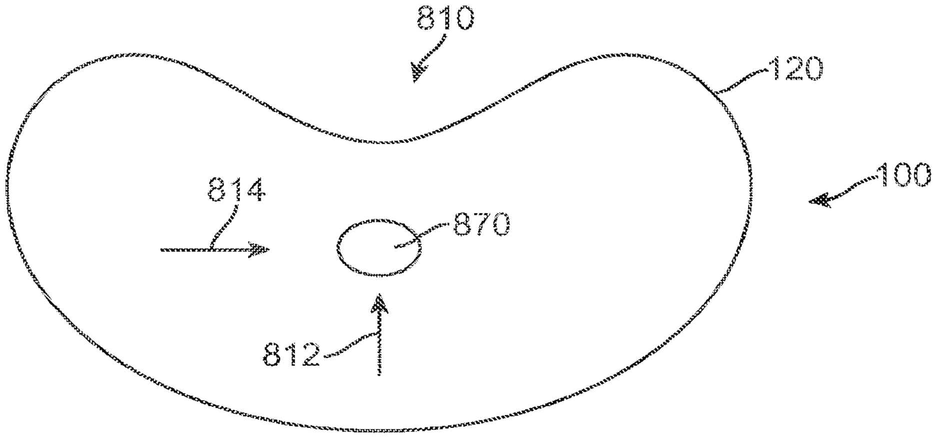
FIG. 11 shows a support comprising a recess and a magnet, according to embodiments of the present invention.

FIG. 11 shows an assembly 100 comprising support 120 comprising recess 810 and a magnet 870. The support 120 comprises short dimension 812 and elongate dimension 814, as described above. The magnet 870 can be configured drive the ear in response to a magnetic field, for example in response to a coil positioned in the ear by a user as described above.

Figure 12A:
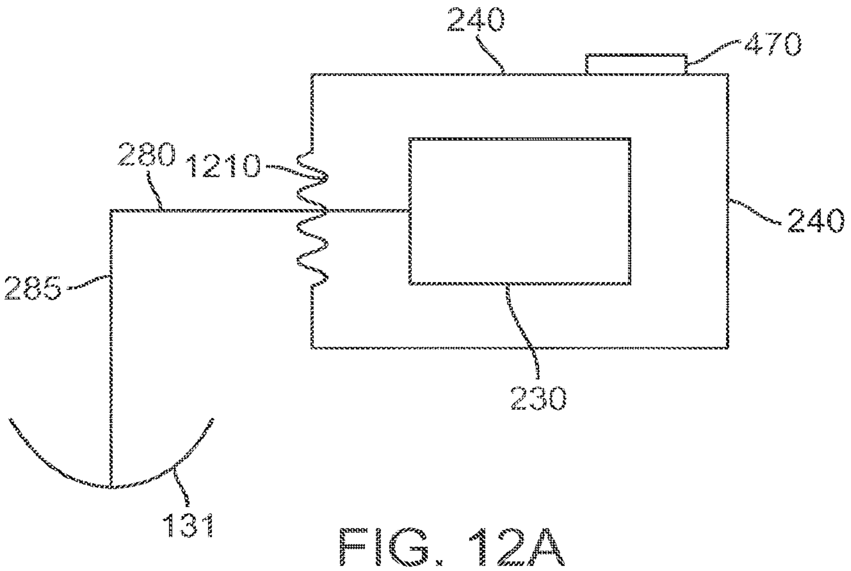
FIG. 12A shows a housing comprising a bellows, in which a rigid structure coupled to the bellows extends through the bellows to couple the transducer to the support with longitudinal motion of the rigid structure, according to embodiments of the present invention.

FIG. 12A shows a housing 1200 comprising a bellows 1210, in which a rigid structure coupled to the bellows extends through the bellows to couple the transducer to the support with motion of the rigid structure. Housing 1200 may comprise many of the components described above, for example with reference to FIGS. 2C1 to 2C4. The rigid structure may comprise reed 280, and housing 1200 may comprise housing 240 of the balanced armature transducer 230 as described above. The bellows 1210 can move the reed, such that the volume of air within the transducer does not change substantially when the reed vibrates, so as to affect sealing of the housing without affecting substantially the gain of the transducer. The change in the volume of air within the transducer can be referred to as delta V (hereinafter "ΔV"), and ΔV can be substantially zero for the sealed transducer. The bellows may comprise many known materials, for example at least one of polyethylene terephthalate (PET), polyester, Nylon®, metalized nylon, foil or Mylar®.

Figure 12B:
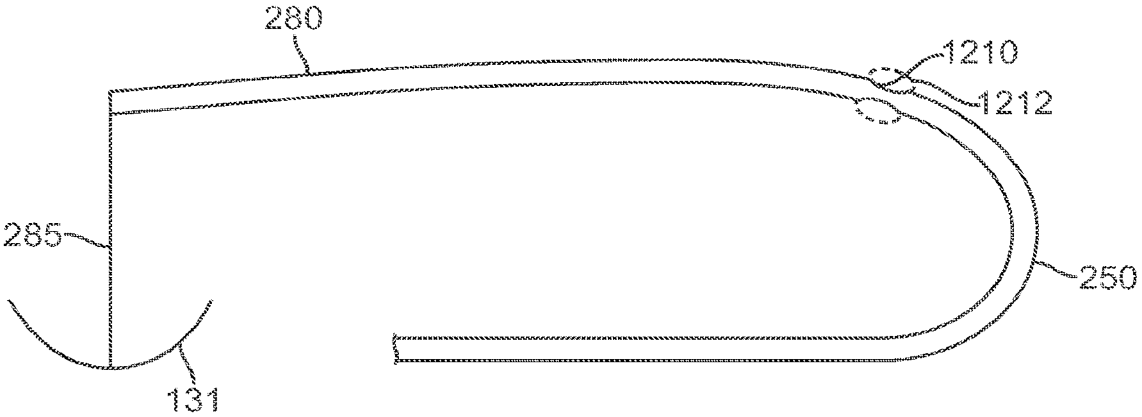
FIG. 12B shows a balanced armature configured to pivot and a positioning of ferrofluid to increase gain, in accordance with embodiments.

FIG. 12B shows a balanced armature 250 comprising an indentation 1210 so as to pivot the armature 250 and a ferrofluid 1212 positioned on the indentation 1210 so as to increase gain. The pivoting of armature 250 about indention 1210 can occur in combination with bending of the armature, for example bending of the U-shaped end portion, so as to increase the gain of the transducer when coupled to the eardrum TM. The armature 250 may comprise an indentation 1210, such as divot, to pivot the reed 280 of the armature coupled to post 285 so as to increase gain. The ferrofluid 1212 and permit magnetic flux to extend along the armature without a substantial decrease in transmission of the flux at the indentation.

Figure 13:
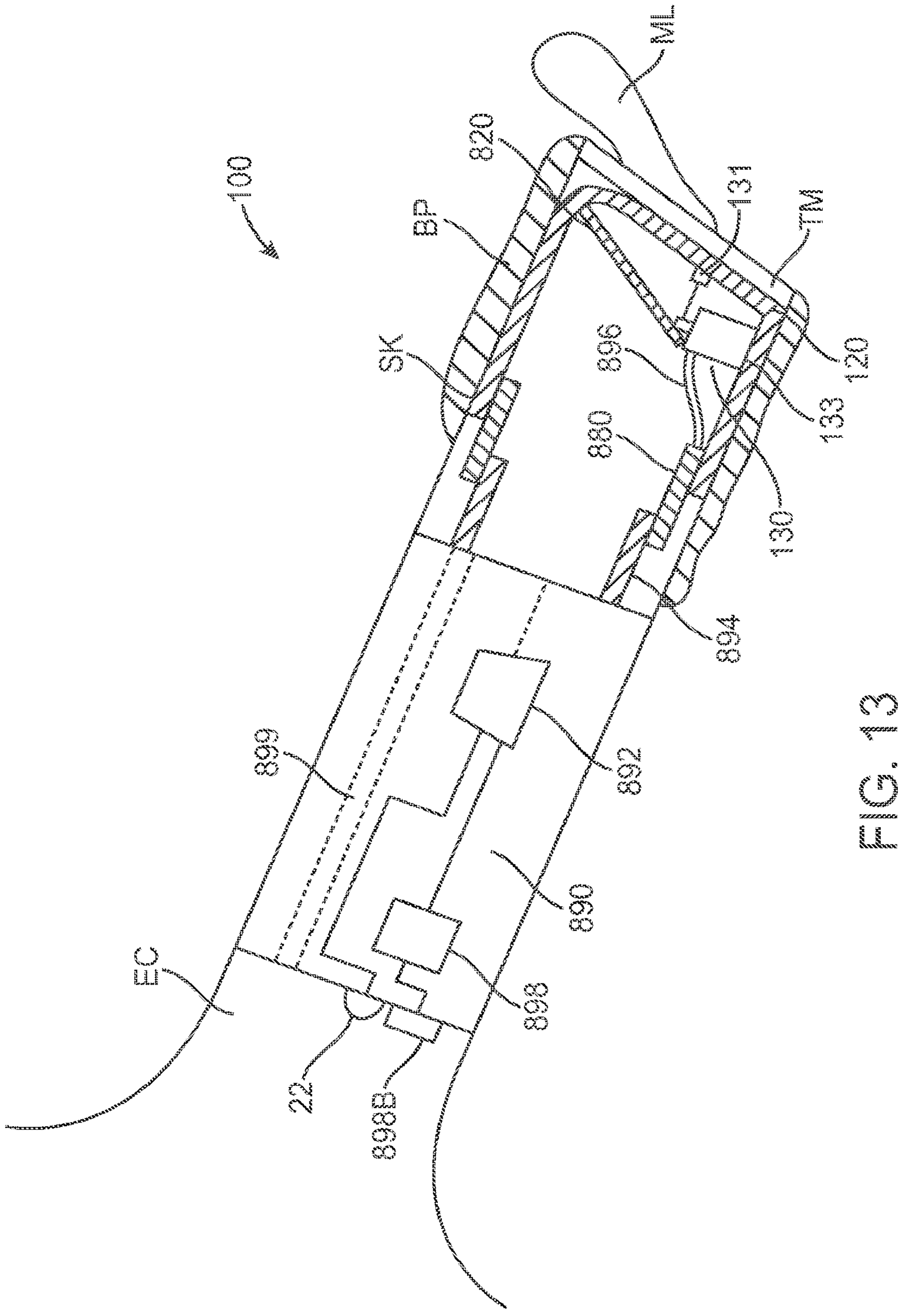
FIG. 13 shows a support comprising an annular connector configured to couple to module inserted in the ear canal so as to couple electrically the transducer on the support with the circuitry of the module, according to embodiments of the present invention.

FIG. 13 shows a support comprising an annular connector 880 configured to couple to module 890 inserted in the ear canal so as to couple the transducer 130 on the support with the circuitry 892 of the module 890. The transducer can be coupled to the support with the many structures and methods as described above, for example so as to couple the transducer to the eardrum and decrease occlusion and to inhibit low frequency loading, for example static loading, of the transducer and eardrum, as described above. Module 890 may be shaped from a mold of the user's ear canal EC. Assembly 100 coupled to module 890 may comprise a recess 810 to decrease contact with tissue near vessels that may extend along the malleus, as described above. Assembly 100 coupled to module 890 may comprise at least one structure 820 to urge an inner portion of the support toward the eardrum TM, and may comprise second transducer 828 to couple first transducer 130 with the inner portion of the eardrum as described above. Circuitry 892 can be coupled to microphone 22 and amplify high frequency sound, for example up to 15 kHz or more, and drive assembly 100 with an electrical connection so as to efficiently drive assembly 100. Circuitry 892 may comprise a sound processor. Module 890 may comprise a connector 894 configured to mate with connector 880 of assembly 100. Module 890 may comprise the microphone 22 for insertion into the ear canal, and may comprise an energy storage device to 898 configured to store electrical energy. The storage device may comprise many known storage devices such at least one of a battery, a rechargeable batter, a capacitor, a supercapacitor, or electrochemical double layer capacitor (EDLC). Connector 894 and connector 880 permit removal of the module, for example for recharging or when the user sleeps. When module 890 is removed from the ear, assembly 100 can remain in place. Module 890 may comprise a channel 899 to pass air so as to decrease occlusion, in combination with the mass of transducer 130 support away from the umbo as described above. Although air is passed through channel 899, feedback can be reduced as compared to an acoustic speaker in the ear canal due to the direct mechanical coupling of the transducer to the eardrum TM.

Connector 894 and connector 880 can be configured in many ways such that circuitry 892 can efficiently drive transducer 130 of assembly 100. For example, the connectors by provide direct electrical contact of electrical conductors such that the amplifier circuitry 892 is coupled to transducer 130 with an electrical connection. Work in relation to embodiments suggests that direct electrical contact and direct coupling to the eardrum TM as described above can be more efficient than conventional acoustic hearing aids with a speaker positioned in the ear canal, for example about ten times as efficient, such that the lifetime of a battery can exceed six months. Alternatively to the direct electrical connection, connector 894 and connector 880 may provide electromagnetic inductive coupling, for example with a core of the module 890 positioned within coil of assembly 100. The module 890 may also be coupled to assembly 100 optically, as described above. The connector 880 may comprise a component of the input element 270.

The energy storage device 898 may comprise a rechargeable energy storage device that can be recharged in many ways. For example, the energy storage device may be charged with a plug in connector coupled to a super capacitor for rapid charging. Alternatively, the energy storage device may be charged with an inductive coil or with a photodetector as described above. The photodetector detector may be positioned on a proximal end of the module 890 such that the photodetector is exposed to light entering the ear canal EC. The photodetector can be coupled to the energy storage device 898 so as to charge the energy storage device. The photodetector may comprise many detectors, for example black silicone as described above. The rechargeable energy storage device can be provided merely for convenience, as the energy storage device 898 may comprise batteries that the user can replace when module 890 is removed from ear canal EC.

Experimental Models, Measurements and Simulations.

Laser Doppler vibration measurements of balanced armature output transducers were used with a mathematical model of the umbo to mathematically model the loaded response of the output transducers on the human ear. Exemplary balanced armature output transducers that were measured included an FK-Flat output transducer and a WBFK-Flat output transducer (wide-band), which are commercially available through Knowles Electronics of Itasca, IL. The response of the output transducers were mathematically modeled as if the output transducer were supported on the malleus of the ear while the armature or reed of the output transducer exerted a force on the umbo of the ear through a reed post as described above.

Figure 14:
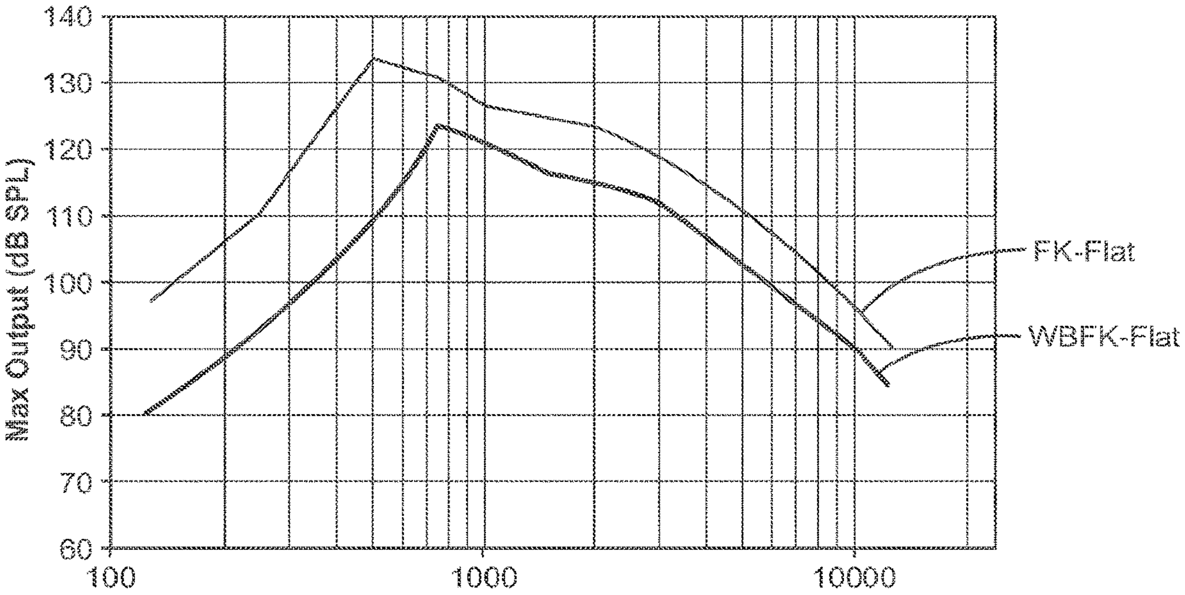
FIG. 14 shows the output response of exemplary output transducers according to embodiments of the present invention.

FIG. 14 shows the predicted maximum output for the FK-Flat and WBFK-Flat output transducers at audiometric frequencies, the transducer set at 60 μW and 0.35 V.

The WBFK-Flat output transducer has a smaller size and would fit with a wider range of anatomy. The WBFK-Flat output transducer, however, may not have an output performance as good as the FK-Flat output transducer. The force generated per unit current was 2.55 N/A for the FK-Flat output transducer and 0.98 N/A for the WBFK-Flat output transducer.

Table 1 below shows exemplary parameters for the mathematical modeling of the loaded response of the FK-Flat output transducer.

TABLE 1

| Exemplary Parameters for FK-Flat | Symbol | Value |
|---|---|---|
| Variable | | |
| Moving "center" mass | mg | 4 mg (+1.6 mg for equivalent reed) |
| Reference "fixed" mass | W | 17 mg (−1.6 mg for equivalent reed) |
| Low frequency displacement per volt | $\frac{d}{A}$ | 9.1 μm/mA |
| Resonant frequency | $f_{reas}$ | 1120 Hz |
| DC Resistance | R | 50 Ohm |
| Impedance | L | 5.8 mH |
| Derived Parameters | | |
| Effective Stiffness | | 277 N/m |
| Force per unit current | | 2.55 N/A |

The 17 mg equivalent fixed load and the 6 mg moving load were calculated from a model which can be described as a pinned cantilever with a spring opposite the pin. For an inertial mass of 48 mg, a reed length of 4.2 mm, and a reed post height of 2.2 mm, the equivalent M L2 load can be given by the equation:

$$\frac{F}{x} = \frac{I_{cg} + \frac{M_{cg}L^2}{4}}{L^2}, \text{ where } I_{cg} = \frac{1}{12}M_{cg}(L^2 + h^2), M_{cg}$$

$M_{cg}$ is the mass at the center of the transducer, and x is the acceleration of the output transducer.

Based on the above equation, for the 48 mg mass, the equivalent load for the model is 17 mg, which can significantly decrease perceived occlusion. In addition to the offset 48 mg mass, the transducer assembly also comprises the 4 mg support and the approximately 2 mg reed post.

Previous testing of output transducers placed on the eardrum had suggested that a mass of 50 mg or more placed on the eardrum would result in significant occlusion. With an output transducer offset away from the umbo and modeled as a cantilever, the effective occlusion for a 48 mg mass that is offset from the umbo is only about 17 mg. Therefore, occlusion is substantially minimized or decreased with the assembly comprising components positioned on the support for placement away from the umbo when the support is placed on the eardrum.

Studies are also contemplated to optimize balanced armature transducers, such as the FK-Flat and WBFK-Flat output transducers, and others for use with a support coupled directly to a patient's eardrum. For example, a balanced armature transducer may be optimized to drive a load of a support coupled to the eardrum of a patient. An empirical number of patients, for example 10, may be tested with various designs of balanced armature transducers to determine optimum working ranges of various design parameters. Further, bench studies can be conducted and measurements made to further optimize the design. Such parameters to be optimized can include a size of the balanced armature transducer, its geometry, electrical impedance, the materials from which the balanced armature transducer is made, ferrofluid disposed in a cavity between poles of a magnet of the transducer, a spring constant of a restoring member, the number of turns of a wire of a coil wrapped around the armature of the balanced armature transducer, or the diameter of the wire. The armature may also comprise an opposing mass on an end of the armature opposite the support, such that the armature is balanced when coupled to the support configured for placement against the ear of the patient. The output mechanical impedance of the balanced armature transducer can be matched to an input mechanical impedance of the support, so as to optimize mechanical energy transmission from the balanced armature to the eardrum.

Experimental studies have been conducted with people and supports comprising balanced armature transducers in accordance with some embodiments as described above. With the embodiment tested, the balanced armature transducer was affixed to the support at a first location corresponding to the umbo and a second location toward at least about 4 mm away from the umbo. In at least one instance experiments the support comprising a balanced armature transducer became decoupled from the eardrum. Although fluid had been placed on the eardrum to couple the support and the transducer to the eardrum, the support decoupled. The user noticed that the slight and tolerable occlusion that was normally present did not occur. This empirical data supports the hypothesis that reduced occlusion can result with transducer supported on an outer portion of the support away from the umbo. This data also indicates that a structure can be provided on the support to urge the transducer toward the eardrum. For example, the structure may comprise an elastic structure, or a resilient structure such as a spring. This urging of the transducer toward the eardrum can improve coupling of the transducer to the eardrum and may decrease substantially, even eliminate, the use of fluid to couple the support to the eardrum.

Experimental studies have been conducted with people and supports comprising balanced armature transducers in accordance with some embodiments as described above. In at least some instances experiments conducted supports extending over the malleus and contacting the eardrum near the periphery of the eardrum have shown that the user can perceive the pulse of the heart beat, for example with the second end of the transducer positioned over the lateral process. In at least some instances attaching the second end of the transducer to the support at a location of the support away from the malleus has substantially decreased this sensation. Further studies with the recess to decrease contact with tissue comprising vascular structures as described above are contemplated. Alternatively or in combination, the first end of the transducer can be coupled to the support at a location corresponding to an inner portion of the eardrum away from the umbo, which can receive at least some blood with pulsatile flow. Based on the teachings described herein, one of ordinary skill in the art can conduct additional empirical studies to determine the shape of the recess and attachment locations of the transducer to the support so as to inhibit this user perceived sound of the heartbeat.

While the above is a complete description of the preferred embodiments of the invention, various alternatives, modifications, and equivalents may be used. Therefore, the above description should not be taken as limiting in scope of the invention which is defined by the appended claims.

What is claimed is:

1. A method of inductively transmitting an audio signal to a user, the method comprising:

inductively coupling a first coil to a second coil, wherein the first coil is placed in an ear canal of the user and the second coil is connected to a part of a transducer placed at least partially against an eardrum of the user;

bending a piezoelectric element in response to current driven through the second coil;

vibrating the eardrum of the user through the bending of the piezoelectric element; and supporting the transducer while the piezoelectric element is bent in response to the current driven through the second coil by providing a support configured for placement at least partially against an outer portion of the eardrum without penetrating the outer portion.

2. A method according to claim 1, the method further comprising the step of urging the transducer toward the eardrum in response to the transducer being placed at least partially against the eardrum.

3. A method according to claim 2 wherein the transducer is urged toward the eardrum by a compression structure.

4. A method according to claim 3 wherein the transducer is urged toward the eardrum by at least one spring.

5. A method according to claim 4 wherein the at least one spring comprises two springs.

* * * * *